(12) United States Patent
Shimamura

(10) Patent No.: US 11,080,866 B2
(45) Date of Patent: Aug. 3, 2021

(54) DYNAMIC IMAGE PROCESSING METHOD AND DYNAMIC IMAGE PROCESSING DEVICE

(71) Applicant: Konica Minolta, Inc., Tokyo (JP)

(72) Inventor: Kenta Shimamura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 89 days.

(21) Appl. No.: 16/227,591

(22) Filed: Dec. 20, 2018

(65) Prior Publication Data
US 2019/0197705 A1 Jun. 27, 2019

(30) Foreign Application Priority Data
Dec. 22, 2017 (JP) .............................. JP2017-245694

(51) Int. Cl.
*G06K 9/00* (2006.01)
*G06T 7/277* (2017.01)
(Continued)

(52) U.S. Cl.
CPC .............. *G06T 7/277* (2017.01); *G06T 5/006* (2013.01); *G06T 5/50* (2013.01); *G06T 7/20* (2013.01); *G06T 2207/10016* (2013.01); *G06T 2207/10081* (2013.01); *G06T 2207/10116* (2013.01); *G06T 2207/20104* (2013.01); *G06T 2207/20182* (2013.01); *G06T 2207/30008* (2013.01); *G06T 2207/30061* (2013.01); *G06T 2207/30096* (2013.01); *G06T 2207/30101* (2013.01)

(58) Field of Classification Search
None
See application file for complete search history.

(56) References Cited

U.S. PATENT DOCUMENTS

2006/0098854 A1\* 5/2006 Oosawa ................ G06T 7/0012
382/128
2013/0156158 A1\* 6/2013 Noji ........................ A61B 6/50
378/62

FOREIGN PATENT DOCUMENTS

JP 2010005109 A 1/2010
JP 2012000297 A \* 1/2012 ............... A61B 6/00
(Continued)

OTHER PUBLICATIONS

JPO Notice of Reasons for Refusal corresponding to JP Patent Application. No. 2017-245694; dated Apr. 27, 2021.

*Primary Examiner* — Suhail Khan
(74) *Attorney, Agent, or Firm* — Cantor Colburn LLP

(57) ABSTRACT

A dynamic image processing method in a dynamic image processing device performing an image processing of a dynamic image includes a setting step of setting a reference motion, a corresponding point setting step of setting a corresponding point according to the reference motion among frame images of the dynamic image for each pixel of the dynamic image, a determination step of determining an enhancement degree of each pixel of each of the frame images of the dynamic image based on equality of a density distribution in a target time range of a small region surrounding the corresponding point set for each pixel at the corresponding point setting step; and an enhancement/attenuation processing step of performing enhancement processing or attenuation processing to each of the frame images of the dynamic image based on the enhancement degree determined at the determination step.

18 Claims, 16 Drawing Sheets

(51) Int. Cl.
G06T 5/00 (2006.01)
G06T 5/50 (2006.01)
G06T 7/20 (2017.01)

(56) References Cited

FOREIGN PATENT DOCUMENTS

| JP | 5402056 B2 | 1/2014 |
| JP | 5556413 B2 | 7/2014 |
| JP | 2016073466 A | 5/2016 |

* cited by examiner

SLIGHTLY VENTRAL TO HEART

SAME SECTION AS HEART IN DORSOVENTRAL DIRECTION

SLIGHTLY DORSAL TO HEART

DURING EXPIRATION

← VENTRAL SIDE    DORSAL SIDE →
L

DURING INSPIRATION

← VENTRAL SIDE    DORSAL SIDE →
L

DYNAMIC IMAGE PROCESSING METHOD AND DYNAMIC IMAGE PROCESSING DEVICE

CROSS-REFERENCE TO RELATED APPLICATION

The present application claims priority under 35 U.S.C. § 119 to Japanese Patent Application No. 2017-245694, filed on Dec. 22, 2017, the entire contents of which are incorporated herein by reference.

BACKGROUND OF THE INVENTION

1. Technological Field

The present invention relates to a dynamic image processing method and a dynamic image processing device.

2. Description of the Related Art

A dynamic image obtained with radiographic imaging of dynamic states of a living body, which enables observation of the form and movement of a structure such as lung tumor, etc., is expected to be useful for diagnosis of diseases. However, each frame image of a dynamic image is an image taken at a low dose of radiation and there have been problems in the visibility of each structure which moves in a state where multiple overlapping structures move in a dynamic image (e.g. anterior rib, posterior rib, pulmonary blood vessel, tumor, muscle fat, etc. in a dynamic image of lung field of chest region).

For example, in the patent document 1 (Japanese Unexamined Patent Application Publication No. 2016-73466), in a radiographic image of chest region, structures other than a lung field (an object of diagnosis) (e.g. bones) are specified with structure form models, and the specified structures are attenuated.

In the patent document 2 (Japanese Patent No. 5402056), a filtering processing is performed on a dynamic image, where components in multiple frequency ranges are respectively extracted from information on time-series fluctuation of pixel values of image data of multiple frames, and dynamic image data with multiple enhanced objects which move on different cycles is generated.

In the patent document 3 (Japanese Patent No. 5556413), there is described a technique as follows: a region of a predetermined structure is extracted from each of multiple frame images in a dynamic image, and an inter-frame difference image is generated from differential signal values of corresponding pixels in frame images next to one another in time-series; the amount of signal variation caused by movement of structures is assumed on the basis of the signal values in the region of structures extracted in the inter-frame difference image; the signal values of the lung-field region are corrected on the basis of the assumed amount of signal variation.

In the patent document 1, however, although large and clear structures such as bones may be specified as an object, minute structures such as a tumor may not be specified, as a region of attenuation object is specified with structure form models.

In the patent document 2, although structures at a frequency of specific movement may be enhanced, components of movement are simply enhanced with a frequency filter. Thus, the visibility of structure is deteriorated on an image.

In the patent document 3, the movement range of a minute structure such as a tumor may not be assumed due to the influence of overlapping of multiple structures.

To sum up, the visibility of minute structures such as a tumor may not be improved with the techniques of the patent documents 1 to 3.

SUMMARY

Objects of the present invention include improving the visibility of a structure(s) in a dynamic image with focus on motion of the structure(s).

In order to achieve at least one of the objects, according to an aspect of the invention, the dynamic image processing method reflecting one aspect of the present invention is a method in a dynamic image processing device performing an image processing of a dynamic image which is obtained by radiographing of a dynamic state of a living body, which includes:

a setting step of setting a reference motion;

a corresponding point setting step of setting a corresponding point according to the reference motion among frame images of the dynamic image for each pixel of the dynamic image;

a determination step of determining an enhancement degree of each pixel of each of the frame images of the dynamic image based on equality of a density distribution in a target time range of a small region surrounding the corresponding point set for each pixel at the corresponding point setting step; and an enhancement/attenuation processing step of performing enhancement processing or attenuation processing to each of the frame images of the dynamic image based on the enhancement degree determined at the determination step.

According to another aspect of the present invention, the dynamic image processing device reflecting one aspect of the present invention includes a hardware processor which:

sets a reference motion;

sets a corresponding point according to the reference motion among frame images of the dynamic image for each pixel of the dynamic image;

determines an enhancement degree of each pixel of each of the frame images of the dynamic image based on equality of a density distribution in a target time range of a small region surrounding the corresponding point set for each pixel; and performs enhancement processing or attenuation processing to each of the frame images of the dynamic image based on the determined enhancement degree.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention, wherein.

DETAILED DESCRIPTION OF EMBODIMENTS

Hereinafter, an embodiment of the present invention is described with reference to the drawings. The scope of the invention is not limited thereto, though.

[Configuration of Dynamic Image Processing System 100]

First, a configuration of the present embodiment is described.

Figure 1:
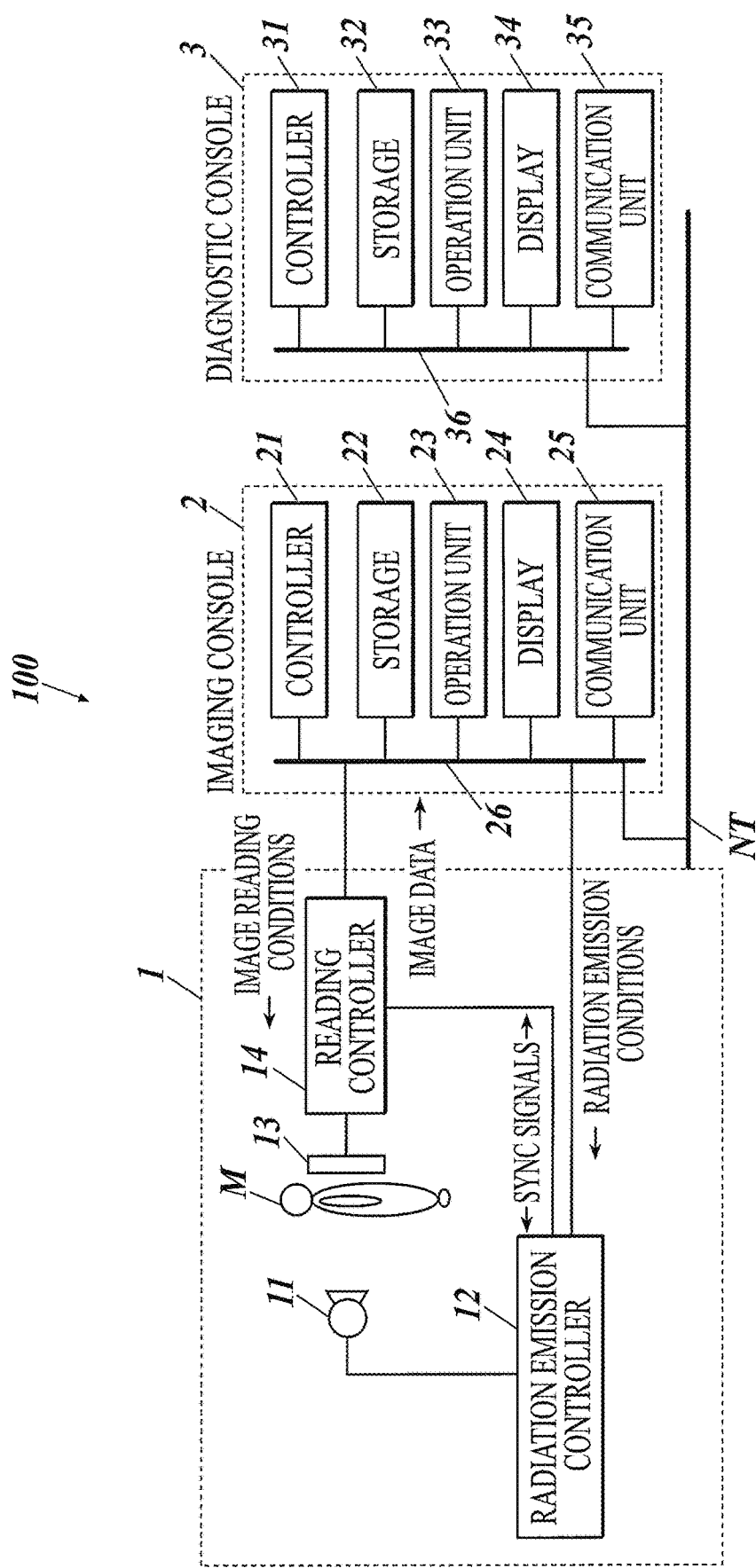
FIG. 1 shows an overall configuration of a dynamic image processing system in an embodiment of the present invention.

FIG. 1 shows an overall configuration of a dynamic image processing system 100 in this embodiment.

As shown in FIG. 1, the dynamic image processing system 100 is configured to include: an imaging device 1 and an imaging console 2 connected via a communication cable, etc.; and the imaging console 2 and a diagnostic console 3 connected via a communication network NT such as a LAN (Local Area Network), etc. Devices included in the dynamic image processing system 100 are in conformity with DICOM (Digital Image and Communications in Medicine) standard, and communicate with one another in conformity with DICOM.

[Configuration of Imaging Device 1]

The imaging device 1 is an imaging means to obtain images of a dynamic state with a periodicity (cycle) such as morphological change of the lung expansion and contraction with respiration, pulsation of the heart, etc. The dynamic imaging is to obtain multiple images showing the dynamic state of an object by repeated emission of radiation, such as X rays, to the object at predetermined intervals of time in a pulse state or continuous emission (successive emission) at a low dose of radiation without intervals. A series of images obtained by the dynamic imaging are called a dynamic image. Images making up a dynamic image are each called a frame image. In the embodiment described hereinbelow, the dynamic imaging by pulse emission to the frontal chest is shown as an example.

The radiation source 11 is arranged at the position facing a radiation detector 13 with an object M in between, and emits radiation (X-rays) to the object M under the control by a radiation emission controller 12.

The radiation emission controller 12 is connected to the imaging console 2, and controls the radiation source 11 on the basis of the radiation emission conditions input from the imaging console 2 to perform radiographic imaging. The radiation emission conditions input from the imaging console 2 are, for example, a pulse rate, a pulse width, a pulse interval, the number of frames (frame images) to be obtained by one imaging, a value of current of an X-ray tube, a value of voltage of the X-ray tube, and a type of added filter. The pulse rate is the number of times radiation is emitted per second, and matches the frame rate described below. The pulse width is duration of radiation emission per time. The pulse interval is a period of time from the start of one radiation emission to the start of the next radiation emission, and matches the frame interval described below.

The radiation detector 13 is configured with a semiconductor image sensor, such as an FPD (Flat Panel Detector), etc. An FPD has multiple detection elements (pixels) arranged at predetermined points on a substrate, such as a glass substrate, in a matrix. The detection elements detect radiation with the intensity of radiation that has been emitted from the radiation source 11 and passed through at least the object M, convert the detected radiation into electric signals, and accumulate the electric signals therein. The pixels are provided with switches, such as TFTs (Thin Film Transistors). There are an indirect conversion type FPD that converts X-rays into electric signals with photoelectric conversion element(s) via scintillator(s) and a direct conversion type FPD that directly converts X-rays into electric signals therebetween. Either of them may be used.

The radiation detector 13 is arranged facing the radiation source 11 with the object M in between.

The reading controller 14 is connected to the imaging console 2. The reading controller 14 controls the switches of the pixels of the radiation detector 13 on the basis of the image reading conditions input from the imaging console 2 to switch the electric signals to be read which are accumulated in the pixels, and reads the electric signals accumulated in the radiation detector 13 to obtain image data. This image data is a frame image(s). The pixels of a frame image where there exists a structure have smaller pixel values (density values), as the amount of radiation reaching to the radiation detector 13 is decreased by the structure. For example, in the lung-field region of a chest dynamic image, the density values are smaller where there are ribs, pulmonary vessels, tumors, etc. than in the lung-field region of background. The reading controller 14 outputs the obtained frame images to the imaging console 2. The image reading conditions include a frame rate, a frame interval, a pixel size, and an image size (matrix size), for example. The frame rate is the number of frame images to be obtained per second, and matches the pulse rate. The frame interval is a period of time from the start of one frame image obtaining action to the start of the next frame obtaining action, and matches the pulse interval.

The radiation emission controller 12 and the reading controller 14 are connected to one another, and exchange sync signals so as to synchronize radiation emission actions with image reading actions.

[Configuration of Imaging Console 2]

The imaging console 2 outputs the radiation emission conditions and the image reading conditions to the imaging device 1 to control the radiation imaging and the radiation image reading actions performed by the imaging device 1, and also displays the dynamic image obtained by the imaging device 1 so that a radiographer, such as a radiologist, can check if positioning has no problem, and also can determine if the dynamic image is suitable for diagnosis.

The imaging console 2 includes, as shown in FIG. 1, a controller 21, a storage 22, an operation unit 23, a display 24, and a communication unit 25, and the units are connected to one another by a bus 26.

The controller 21 includes a CPU (Central Processing Unit), a RAM (Random Access Memory), etc. The CPU of the controller 21 reads a system program and various processing programs stored in the storage 22, in response to operations with the operation unit 23, opens the read programs in the RAM, performs various processes, such as an imaging control process described below, according to the opened programs, and performs centralized control of actions of each unit of the imaging console 2 and the radiation emission actions and the reading actions of the imaging device 1.

The storage 22 is configured with a non-volatile semiconductor memory, a hard disk, etc. The storage 22 stores various programs to be executed by the controller 21, parameters necessary to perform processes of the programs, data, such as process results, etc. For example, the storage 22 stores a program for the imaging control process shown in FIG. 2. The storage 22 also stores the radiation emission conditions and the image reading conditions for respective imaging object regions (chest region in this embodiment). The programs are stored in the form of computer readable program code, and the controller 21 executes the actions according to the program code one after another.

The operation unit 23 includes: a keyboard including cursor keys, number input keys, and various function keys; and a pointing device, such as a mouse, and outputs to the controller 21 command signals input by key operations on the keyboard or by mouse operations. The operation unit 23 may have a touchscreen on the display screen of the display 24, and in that case, the operation unit 23 outputs command signals input via the touchscreen to the controller 21.

The display 24 is configured with a monitor such as an LCD (Liquid Crystal Display), or a CRT (Cathode Ray Tube), and displays input commands from the operation unit 23, data, etc. according to the commands of display signals input from the controller 21.

The communication unit 25 includes a LAN adapter, a modem, a TA (Terminal Adapter), etc. and controls data exchange with each unit connected to the communication network NT.

[Configuration of Diagnostic Console 3]

The diagnostic console 3 is a dynamic image processing device that obtains dynamic images from the imaging console 2 and that displays the obtained dynamic images, the analysis results of the dynamic images, etc. to help a doctor(s) make a diagnosis.

The diagnostic console 3 includes, as shown in FIG. 1, a controller 31, a storage 32, an operation unit 33, a display 34, and a communication unit 35, and the units are connected to one another via a bus 36.

The controller 31 includes a CPU, a RAM, etc. The CPU of the controller 31 reads a system program and various processing programs stored in the storage 32, in response to operations with the operation unit 33, opens the read programs in the RAM, performs various processes, such as a structure enhancement processing described below, according to the opened programs, and performs centralized control of actions of each unit of the diagnostic console 3.

The storage 32 is configured with a non-volatile semiconductor memory, a hard disk, etc. The storage 32 stores various programs, including a program for the structure enhancement processing to be executed by the controller 31, parameters necessary to perform processes of the programs, data such as process results, etc. The programs are stored in the form of computer readable program code, and the controller 31 executes the actions according to the program code one after another.

The storage 32 stores the previously obtained dynamic images correlated with patient information (e.g. patient ID, name, height, weight, age, sex, etc.) and examination information (e.g. examination ID, examination date, object region (chest in this embodiment), etc.).

The operation unit 33 includes: a keyboard including cursor keys, number input keys, and various function keys; and a pointing device such as a mouse, and outputs to the controller 31 command signals input by users by key operations on the keyboard or by mouse operations. The operation unit 33 may have a touch screen on the display screen of the display 34, and in that case, the operation unit 33 outputs command signals input via the touch screen to the controller 31.

The display 34 is configured with a monitor such as an LCD, a CRT, etc. and performs various types of display according to the commands of display signals input from the controller 31.

The communication unit 35 includes a LAN adapter, a modem, a TA, etc., and controls data exchange with each unit connected to the communication network NT.

[Actions of Dynamic Image Processing System 100]

Next, actions of the dynamic image processing system 100 according to this embodiment are described.

(Actions of Imaging Device 1 and Imaging Console 2)

First, imaging actions performed by the imaging device 1 and the imaging console 2 are described.

Figure 2:
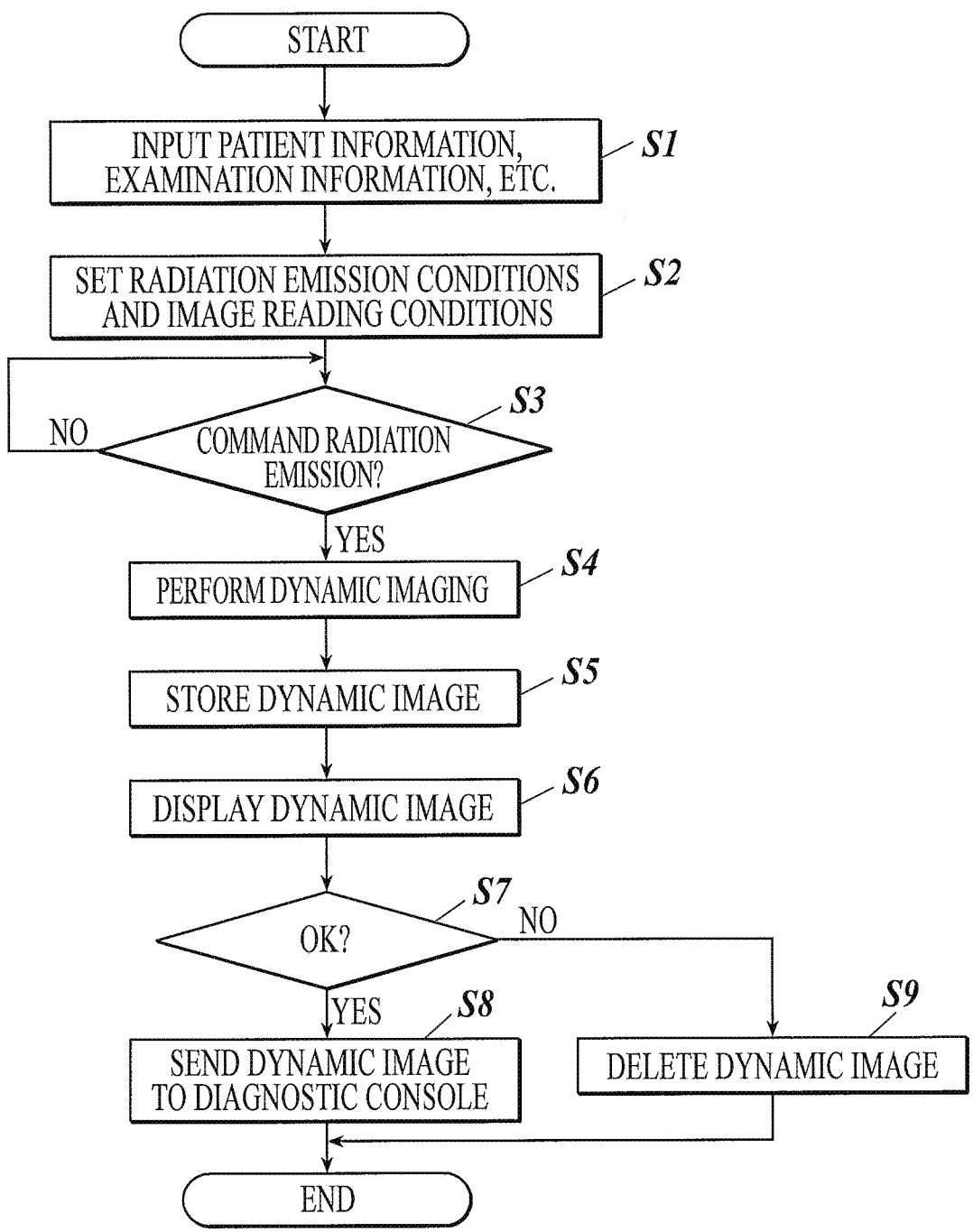
FIG. 2 is a flowchart showing an imaging control process performed by a controller of an imaging console in FIG. 1.

FIG. 2 shows the imaging control process performed by the controller 21 of the imaging console 2. The imaging control process is executed by the controller 21 in cooperation with the programs stored in the storage 22.

First, a radiographer operates the operation unit 23 of the imaging console 2 to input patient information on an examinee (object M) and examination information (Step S1).

Next, the radiation emission conditions are read out from the storage 22 and set in the radiation emission controller 12, and the image reading conditions are read out from the storage 22 and set in the reading controller 14 (Step S2).

Next, the controller 21 waits for a radiation emission command to be input by the operation of the operation unit 23 (Step S3). Here, the radiographer places the object M between the radiation source 11 and the radiation detector 13 for positioning. The radiographer also instructs the examinee (object M) to breathe according to the type of dynamic state of the target for diagnosis. A radiation emission command is input through the operation of the operation unit 23, when preparations for imaging are complete.

When the radiation emission command is input by the operation unit 23 (Step S3; YES), an imaging start command is output to the radiation emission controller 12 and the reading controller 14, and the dynamic imaging starts (Step S4). The radiation source 11 emits radiation at pulse intervals set in the radiation emission controller 12, and accordingly the radiation detector 13 obtains a series of frame images.

When imaging for a predetermined number of frame images is complete, an imaging end command is output to the radiation emission controller 12 and the reading controller 14 by the controller 21, and the imaging actions stop. The number of frame images to be obtained covers at least one breathing cycle.

The frame images obtained by imaging are successively input to the imaging console 2 and stored in the storage 22, being correlated with the respective numbers (frame numbers) indicating the imaging order (Step S5), and displayed in the display 24 (Step S6). The radiographer checks positioning, etc. with the displayed dynamic image, and determines whether the dynamic image obtained by dynamic imaging is suitable for diagnosis (Imaging OK) or re-imaging is necessary (Imaging NG). Then, the radiographer operates the operation unit 23 to input the determination result.

When the determination result "Imaging OK" is input through a predetermined operation of the operation unit 23 (Step S7; YES), attached to a series of frame images obtained in the dynamic imaging is information such as an ID to identify the dynamic image, the patient information, the examination information, the radiation emission conditions, the image reading conditions, and the number indicating the imaging order (frame number), etc. (e.g. written in the header region of the image data in DICOM), and the frame images with information are sent to the diagnostic console 3 via the communication unit 25 (Step S8). Then, the imaging control process ends. On the other hand, when the determination result "Imaging NG" is input through the predetermined operation of the operation unit 23 (Step S7; NO), a series of frame images stored in the storage 22 are deleted (Step S9), and then the imaging control process ends. In that case, re-imaging is necessary.

(Actions of Diagnostic Console 3)

Next, actions of the diagnostic console 3 are described.

In the diagnostic console 3, when a series of frame images of a dynamic image are received from the imaging console 2 via the communication unit 35, the received dynamic image is stored in the storage 32.

Figure 3:
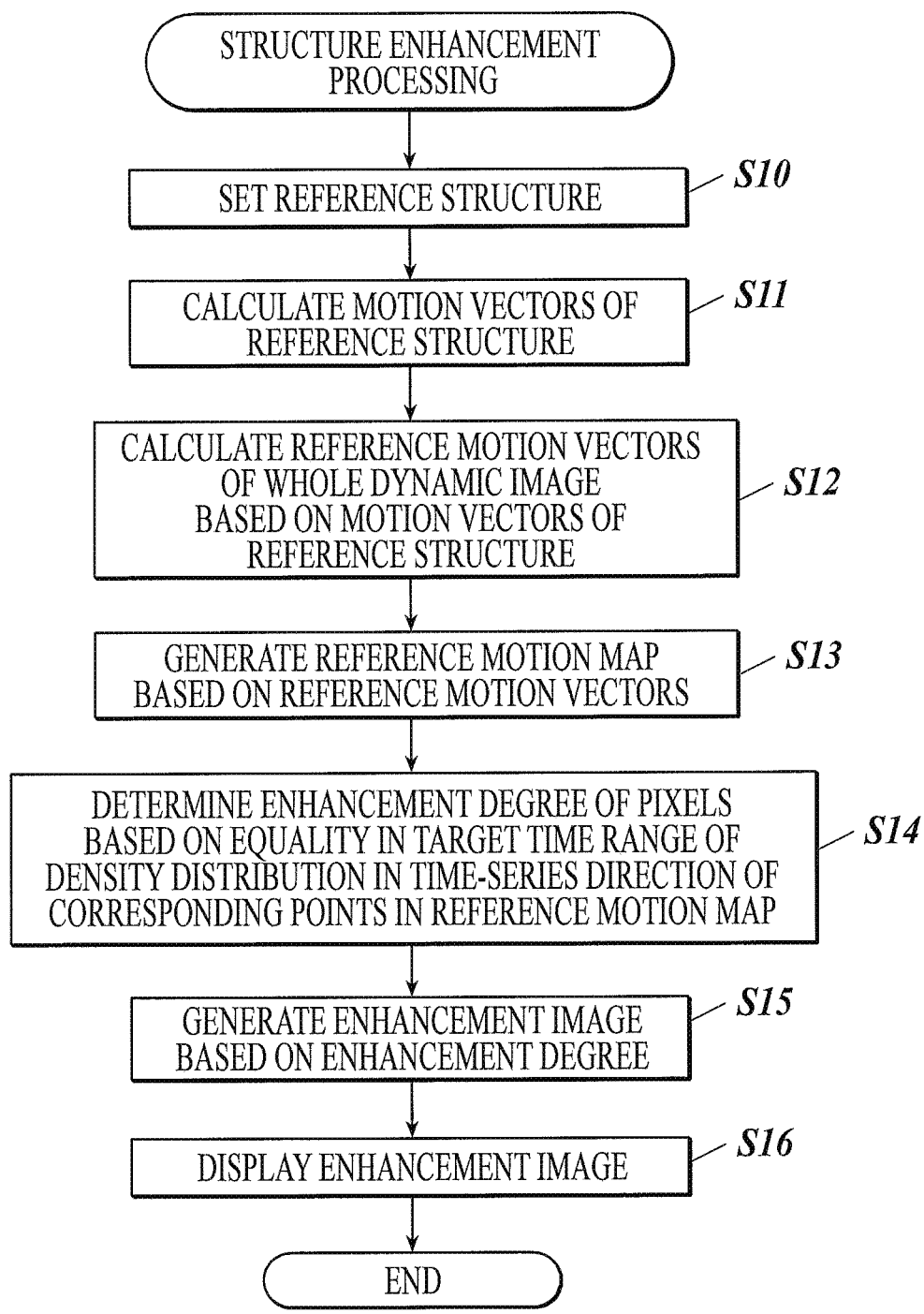
FIG. 3 is a flowchart showing a structure enhancement processing performed by a controller of a diagnostic console in FIG. 1.

When a dynamic image is selected from the dynamic images stored in the storage 32 by the operation unit 33 and a command of structure enhancement display is given, the structure enhancement processing shown in FIG. 3 is executed by the controller 31 in cooperation with the programs stored in the storage 32.

The dynamic image here is taken with dynamic states of multiple structures being overlapped. The visual recognition of a structure focusing on the movement makes it possible to determine what the structure is. For example, a structure moving in accompany with the pulmonary blood vessels (moving in almost the same direction at almost the same amount as the pulmonary blood vessels) may be a lung tumor, and a structure moving in accompany with the bones (moving in almost the same direction at almost the same amount as the bones) may be a bone tumor. That is, the visibility of a structure moving in the same way as some structure or the visibility of a structure moving associatively with some structure may partly supplement the information on the depth direction which is missing and may make the image diagnosis by doctors easier. Thus, in the structure enhancement processing, a structure moving in the same way as a structure to be a point of reference (reference structure) specified by the user is enhanced for improving the visibility. Enhancement here is increasing the gap of density between a structure and the background region for the structure to stand out.

Hereinafter, the flow of the structure enhancement processing is described with reference to FIG. 3. Described in this embodiment is the enhancement of a structure moving in the same way as the reference structure in a case where the lung-field region in a dynamic image is the background region.

First, the reference structure is specified (Step S10).

Figure 4:
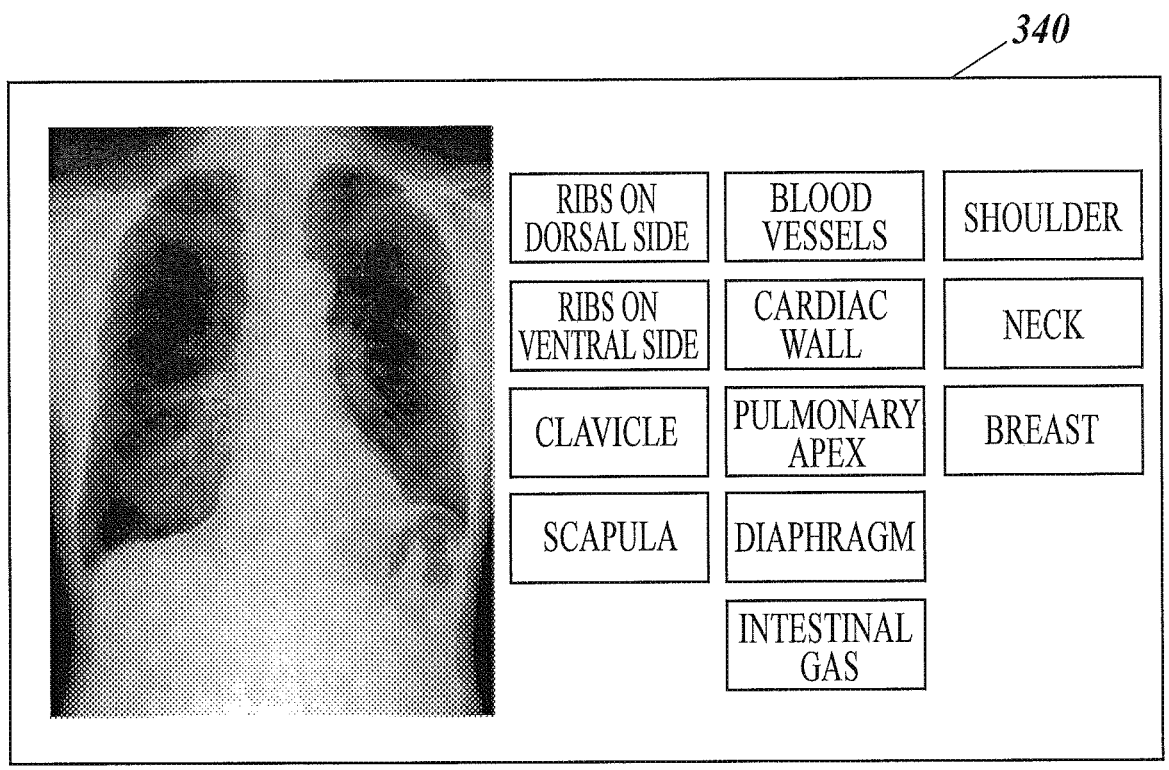
FIG. 4 shows an example of a specification screen to specify a reference structure.

At Step S10, the specification screen 340 in which buttons indicating multiple structures included in a dynamic image of the chest region, for example, are displayed on the display 34, as shown in FIG. 4. The structure corresponding to the button selected by the user on the specification screen 340 through the operation unit 33 is set as the reference structure.

At Step S10, the reference structure may be set respectively in the left and right regions. Alternatively, the dynamic image (or a frame image in the dynamic image) may be displayed on the display 34 and the reference structure may be set to the structure which is clicked on the displayed image with the operation unit 33. When a point on the image is clicked with the operation unit 33, the names of structures around the clicked point may be displayed as options and a structure selected from the options may be recognized as the reference structure. In that case, structures may be extracted on the image beforehand. Then a structure on which a mouse of the operation unit 33 points by mouseover may be highlighted, and the clicked structure may be recognized as the reference structure.

Next, motion vectors of the reference structure are calculated (Step S11).

At Step S11, the region of the reference structure is extracted from each frame image, and the motion vectors of the reference structure between frame images next to one another are calculated. The motion vectors of the reference structure indicate the pixels to which the reference structure moves in the next frame image.

The extraction of the reference structure in each frame image may be done by a known image processing technique such as a general segmentation method, etc. The motion vectors may be calculated on the basis of the position of the reference structure extracted from each frame image or calculated with any other method such as template matching.

The spatial density of the motion vectors to be calculated may be high or low. The amount of calculation decreases as the density is lower. For example, as a rib is rigid and moves in a spatially homogeneous way, the density may be low. On the other hand, a high density enables accurate calculation of the motion vectors of non-rigid structures which move differently in respective spatial positions, such as pulmonary blood vessels. The density of the motion vectors to be calculated may be varied according to the state of breathing. For example, the motion vectors may be calculated at one point for a rib, which often moves simply vertically during quiet breathing. During deep breathing, however, a rib cage expands. Thus, it is preferable to calculate the motion vectors with a higher spatial density especially around the chest.

The temporal density of the motion vectors to be calculated may be high or low. There is also a trade-off between the resolution and the reduction of time. For example, the temporal resolution may be lower during quiet breathing, as the motion changes slowly. However, during deep breathing or while body is roughly moving, the temporal resolution needs to be higher, and the motion vectors need to be calculated with a higher temporal density. The temporal density may be varied according to the motion amount which has been assumed beforehand on the basis of the difference of pixel values between frame images next to one another of the dynamic image.

Figure 5:
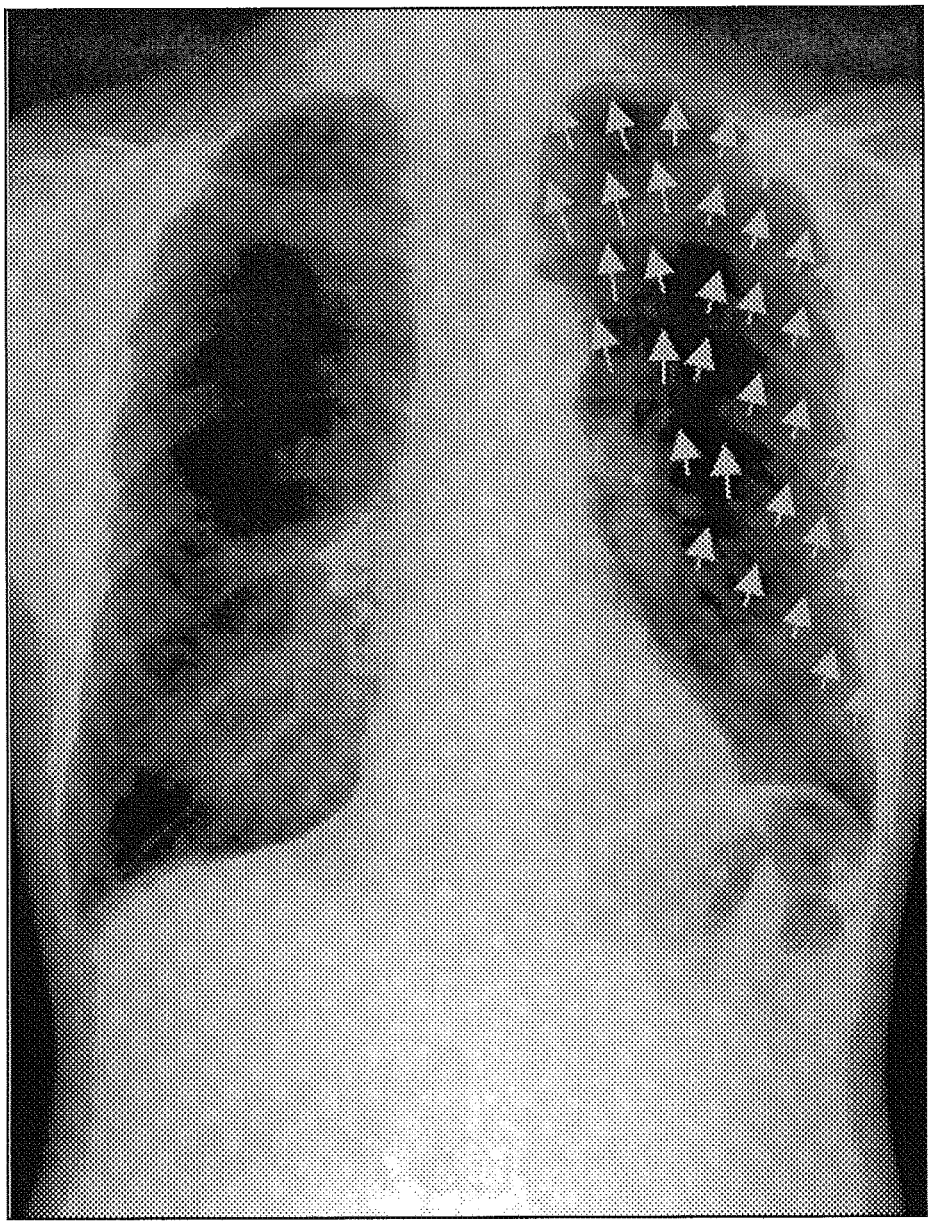
FIG. 5 shows an example of motion vectors of a reference structure.

FIG. 5 shows exemplary calculated motion vectors displayed on a frame image of a dynamic image in a case where the reference structure is ribs on the back side. The motion vectors in the right lung are omitted in FIG. 5.

Preferably, the regions of the options of reference structure are extracted beforehand from each frame image of a dynamic image and the motion vectors of the respective regions between frame images next to one another are calculated and stored. The waiting time of the user can be reduced in that way. The calculation may be done beforehand when the image data is stored into the storage 32 after dynamic imaging, for example. Alternatively, the calculation may be done beforehand at the start of the structure enhancement processing.

Figure 6:
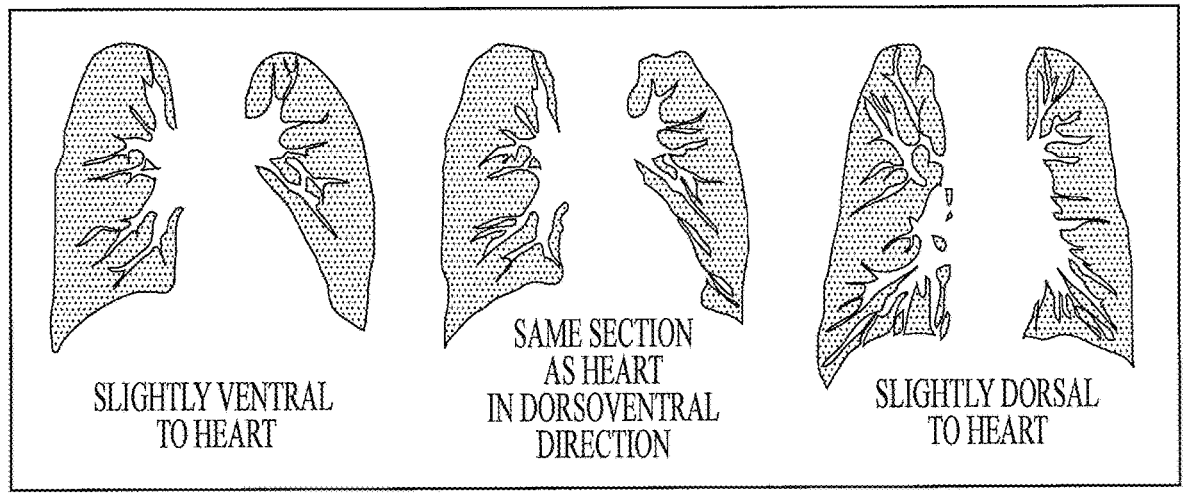
FIG. 6 is a schematic drawing of a circulation region of pulmonary blood vessels in layers in the depth direction of the pulmonary blood vessels.

The pulmonary blood vessels are distributed three-dimensionally in the whole lung and are severally overlapped in the frontal X-ray imaging. As shown in FIG. 6, the circulation region of the pulmonary blood vessels is different according to the position in the depth direction. There would be no problem if all these pulmonary blood vessels moved in the same way. Actually the vessels move differently according to the position in the depth direction, however.

Figure 7:
FIG. 7 shows a motion of the lung field in images taken from the lateral side of the chest during expiration and inspiration.
Figure 7:
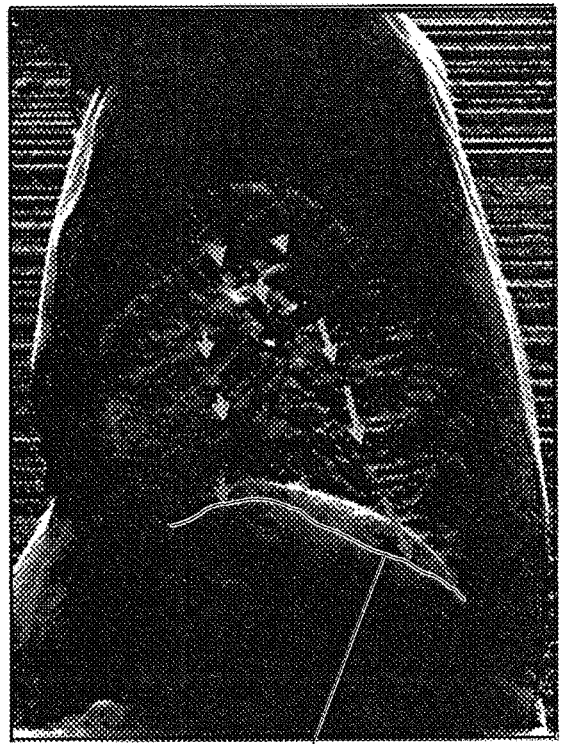

FIG. 7 shows lateral images of the chest during expiration and inspiration. The line L in FIG. 7 indicates the position of the line of diaphragm during breathing and arrows indicate the motion vectors of pulmonary blood vessels. As shown in FIG. 7, the motion amount of diaphragm differs from ventral side to dorsal side, and the diaphragm moves more in the dorsal side. The motion amount also differs from ventral side to dorsal side for the lung and pulmonary blood vessels which move in accompany with the diaphragm. Thus, in a case where the pulmonary blood vessels are set as the reference structure, the regions of pulmonary blood vessels are to be extracted in respective layers from dorsal side to ventral side on the basis of the circulation pattern of the pulmonary blood vessels in term of anatomy, and the motion vectors of the pulmonary blood vessels in the layer to be enhanced alone are to be calculated as the reference structure. As the pulmonary blood vessels in one specific layer in the depth direction are set as the reference structure and the structures which have the same motion vectors as those pulmonary blood vessels are enhanced, the enhancement of structures may be done according to the position in the depth direction physically. This is useful for determination of the position of a tumor, such as on the dorsal side or on the ventral side, and therefore useful for diagnosis.

The region of pulmonary blood vessels may be extracted from frame images with a known image processing technique such as a segmentation method. The following method (1) or (2) may be used as a means for extracting the region of pulmonary blood vessels in multiple layers from ventral side to dorsal side.

(1) The regions of pulmonary blood vessels are extracted separately in respective layers from ventral side to dorsal side according to the anatomical circulation pattern of pulmonary blood vessels prepared beforehand.

For the recognition of pulmonary blood vessels in respective layers in the depth direction, the voxel data of three-dimensional lung and the information on the position of pulmonary blood vessels in general are stored beforehand as model in the storage 32, and the positions of the regions of pulmonary blood vessels are correlated to the positions in the depth direction on the basis of the two-dimensional projection image of the lung. Alternatively, the personal three-dimensional positions of pulmonary blood vessels accurately extracted from a CT image which has been obtained beforehand through CT scanning of the examinee's lung may be the model.

(2) The regions of pulmonary blood vessels are extracted by clustering of pulmonary blood vessels in respective layers according to the motion amount.

Figure 8:
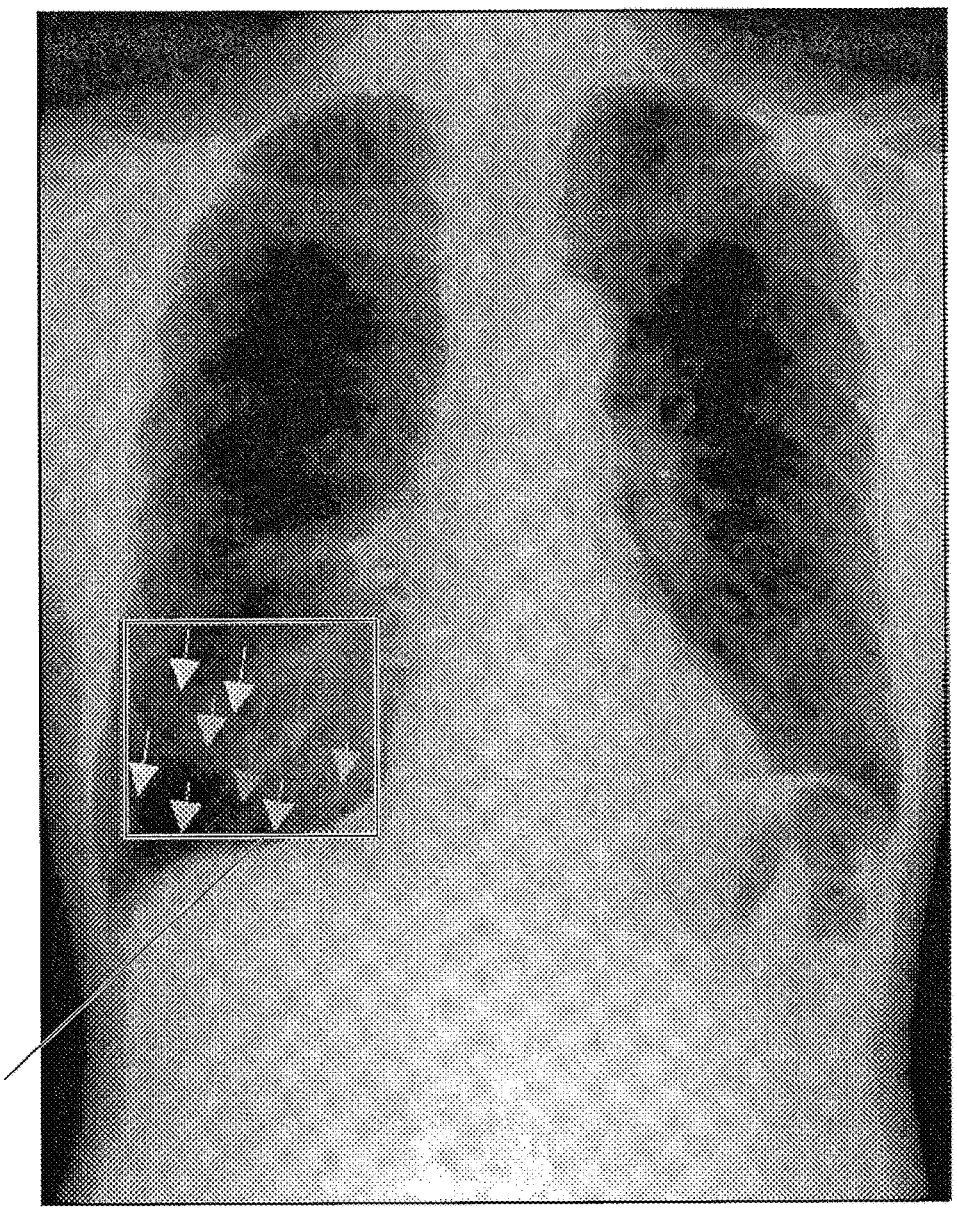
FIG. 8 shows results of clustering of pulmonary blood vessels according to the motion amount by arrows indicating the motion of pulmonary blood vessels.

All the extracted regions of pulmonary blood vessels are tracked and each of the regions is clustered according to the movement amount (motion amount). For example, the motion amount of the pulmonary blood vessels is calculated in the calculation region set to some range of the lower part of the lung such as a rectangular frame R shown in FIG. 8. Then the pulmonary blood vessels are clustered according to the motion amount. In a case where there are multiple clusters of the motion amount, each of the clusters is recognized as a layer of pulmonary blood vessels different from one another. FIG. 8 shows calculation results of the motion amount of the pulmonary blood vessels in the calculation region, which are indicated by arrows colored differently for respective clusters. In FIG. 8, the extracted pulmonary blood vessels are grouped in three clusters and colored in three colors, for example. In that way, the regions of pulmonary blood vessels may be recognized in respective layers in the set calculation region according to the motion amount of pulmonary blood vessels. Further, the pulmonary blood vessels connected to other regions of pulmonary blood vessels of the same cluster are tracked so that the pulmonary blood vessels can be recognized in each layer from the root to the end. In a case where a part of pulmonary blood vessels whose layer is unrecognizable is left, the calculation region is set around that part, and the re-clustering and recognition process of the layers of pulmonary blood vessels are repeated. In that way, all the pulmonary blood vessels may be clustered in respective layers according to the motion amount.

Figure 9A:
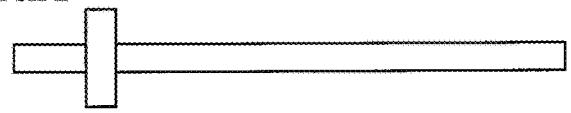
FIG. 9A shows an example of a GUI to set the pulmonary blood vessels in a layer to be enhanced alone as a reference structure.
Figure 9B:
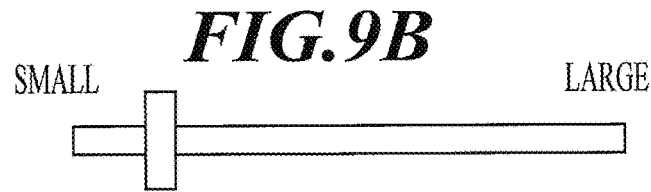
FIG. 9B shows an example of a GUI to set the pulmonary blood vessels in a layer to be enhanced alone as a reference structure.

The GUI (Graphical User Interface) to set the pulmonary blood vessels in the layer to be enhanced alone as the reference structure may include: option buttons indicating ventral side, center, dorsal side, etc., for example, displayed on the display 34 to be pressed by the user; or slide bars to set the position of the layer to be enhanced in the depth direction as shown in FIG. 9A. As shown in FIG. 9B, the reference structure may be set to the layer of the pulmonary blood vessels which has the motion amount set by slide bars indicating the motion amount of pulmonary blood vessels.

The regions of pulmonary blood vessels may be specified directly on the image. The image mentioned here may be a still image (one of frame images) or a motion image (dynamic image). Where a motion image is used, the regions may be specified on a specific frame image of the motion image displayed on the display 34.

Alternatively, the images of the regions of pulmonary blood vessels in respective layers in the depth direction are displayed (see FIG. 6), and the pulmonary blood vessels in the layer to be enhanced may be specified through the operation unit 33. It is preferable that the images in respective layers are shown in a form of motion image, so that the motion of pulmonary blood vessels in the layers may be recognized.

Next, the reference motion vectors are calculated in the whole dynamic image on the basis of the motion vectors of the reference structure (Step S12).

In a case where a structure(s) moves in the same way as the reference structure in the pixels of the dynamic image, the reference motion vectors show in what way the structure moves. The reference motion vectors may be obtained with an interpolation process on the basis of the motion vectors of the reference structure.

At Step S12, the motion vectors of the reference structure obtained at Step S11 is used as the reference motion vectors in the region of the reference structure. When the motion vectors of the reference structure are obtained with a low density, the motion vectors are calculated with interpolation using the motion vectors of the neighboring reference structure(s). The motion vectors of the region other than that of the reference structure are calculated with interpolation using the motion vectors of the neighboring reference structure(s). Also in the region of the reference structure(s), the vectors modified on the basis of the neighboring motion vectors may be the reference motion vectors. The method for interpolation of the reference motion vectors may be a curved surface approximation (e.g. polynomial approximation like spline approximation) or any other method. In the calculation with interpolation, the vectors may be calculated such that they vary successively and smoothly using the reference motion vectors near in time-series.

Figure 10:
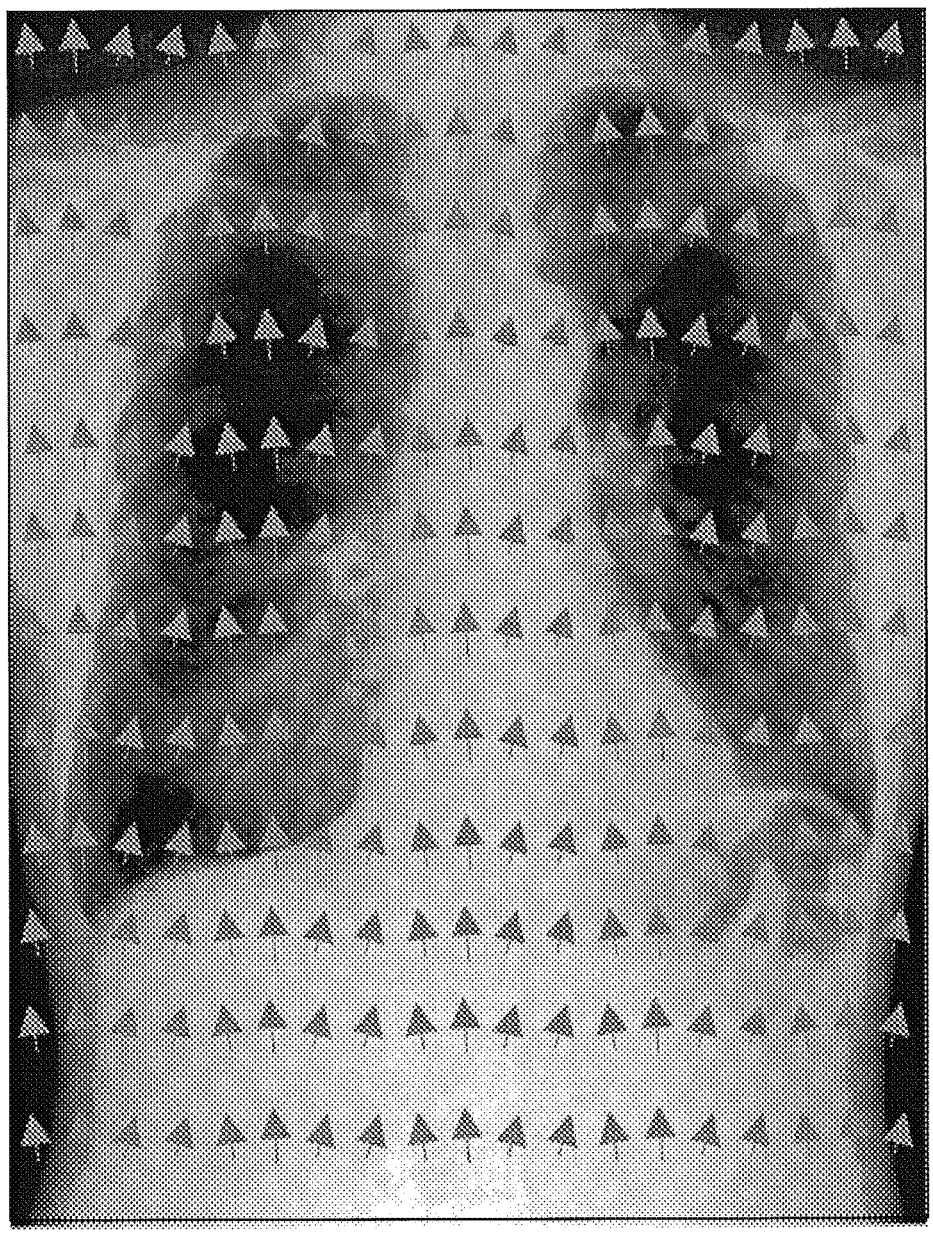
FIG. 10 is a drawing showing reference motion vectors calculated at Step S12 in FIG. 3 indicated by arrows.

FIG. 10 shows an example of the reference motion vectors calculated at Step S12. As shown in FIG. 10, the reference motion vectors are calculated on the whole image (pixels). The reference motion vectors are displayed on the display 34.

Next, the reference motion map is generated on the basis of the reference motion vectors (Step S13).

Figure 11:
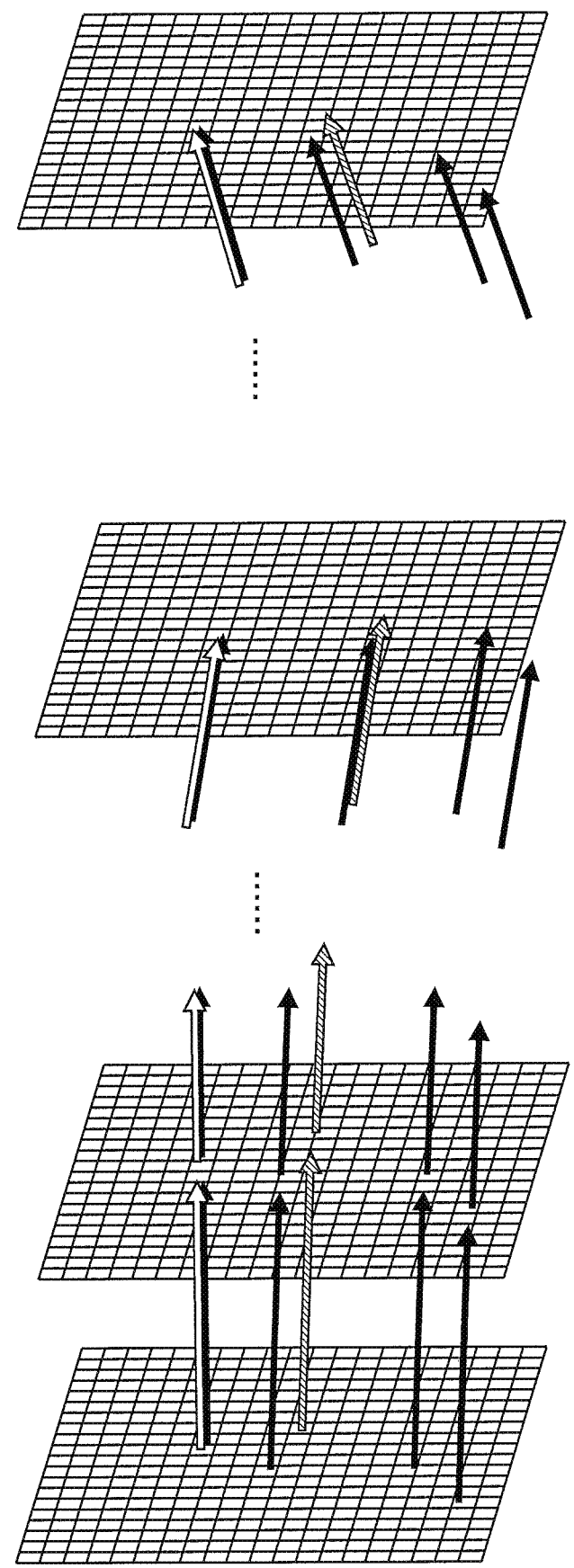
FIG. 11 shows a method of generating a reference motion map.

At Step S13, as shown in FIG. 11, a reference motion map is generated as follows: the reference motion vectors are correlated in the time-series direction; and the corresponding points among frame images are set. The reference motion vectors (Vx, Vy) are stored in the RAM as the data of the reference motion map. The reference motion vectors (Vx, Vy) may be based on the motion of: all pixels on each frame image moving from its previous frame image; or all pixels on each frame image moving to its next frame image. Alternatively, the reference motion vectors (Vx, Vy) to be stored in the RAM may be based on the motion of all pixels on every frame image moving from the reference frame image. The amount of data being huge, it is preferable to reduce the amount of data with thinning out using some kind of approximate expression.

Next, the degree of enhancement of pixels of each frame image of the dynamic image is determined on the basis of the equality of the density distribution in the target time range in the small region surrounding the corresponding point in the reference motion map (Step S14).

At Step S14, the processes (a) to (0 are executed as follows.

(a) The calculation target points, corresponding points, and target frame range (target time range) are set.

All the points in the image space of a frame image (e.g. first frame image) are the calculation target points, the corresponding points in the predetermined target frame range (e.g. all frame images) are obtained for the respective calculation target points with reference to the reference motion map.

(b) The groups of small region images in the time-series direction are generated for the respective calculation target points.

An image (mainly rectangular image) of a small region with a corresponding point being its center (small region surrounding a corresponding point) in a predetermined size (multiple pixels) for each calculation target point is cut out to generate small region images. In the same way, the small region images with the corresponding points of the calculation target points being their respective centers on the frame images in the target frame range are cut out to generate a group of small region images in the time-series direction at the respective calculation target points. The size of the small regions is preferably larger than the target structures to be enhanced (e.g. tumor). The size of the small regions is preferably input in units of millimeter by a user through the operation unit 33.

(c) The density distribution images are generated for the respective small region images in the group of small region images.

The density values of the group of small region images vary in the time-series direction according to the state of overlapping of structures. A reference density value (e.g. the median or the average of the density values of small region image) is calculated for each small region image in the group of small region images. Then a density distribution image making up of differential values between density values of the respective pixels and the reference density value is calculated, as represented by (Formula 1) (normalization based on the reference density value).

Pixel value of the density distribution image (x,y)
=Density value of small region image (x,y)–
Reference density value of small region image    (Formula 1)

The pixel with the reference density value has a value of 0 in the density distribution image. The pixel with a density value larger than the reference density value has a positive value in the density distribution image. The pixel with a density value smaller than the reference density value has a negative value in the density distribution image.

Alternatively, the pixel values (x, y) of the density distribution image may be the ratios of the density values (x, y) of the small region image to the reference density value of the small region image.

When the same structure exists at the corresponding point, the density distribution image often has the same values in the time-series direction in the small region image in a size appropriate for the structure, regardless of change in the density value of the background.

(d) The equal density distribution image is generated by statistical processing in the time-series direction at pixels (x, y) in the density distribution image.

In a frequency plot of pixel values in the time-series direction at pixels (x, y) in the density distribution image, the pixel values are frequently equal in a case where a structure (target structure to be enhanced) moving in the same way as the reference structure is on the image. This frequent pixel value is set as the pixel value of the equal density distribution image (see FIG. 12B). The pixel value of pixels (x, y)

in the equal density distribution image is obtained by the following (Formula 2), for example.

Pixel value of equal density distribution image $(x,y)$
=Most frequent value of density distribution
image $(x,y)$ in the time-series direction          (Formula 2)

The median or average value may be used in place of the most frequent value. In a case where the pixel values drastically vary in the time-series direction and there is no frequent pixel value, the pixel value of the equal density distribution image may be set to 0 to avoid enhancement.

Figure 12A:
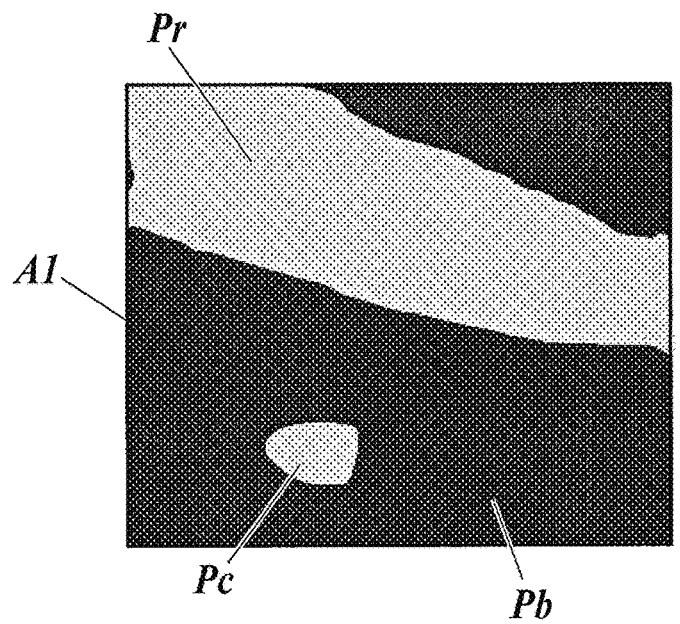
FIG. 12A shows a small region in a frame image of a dynamic image.
Figure 12B:
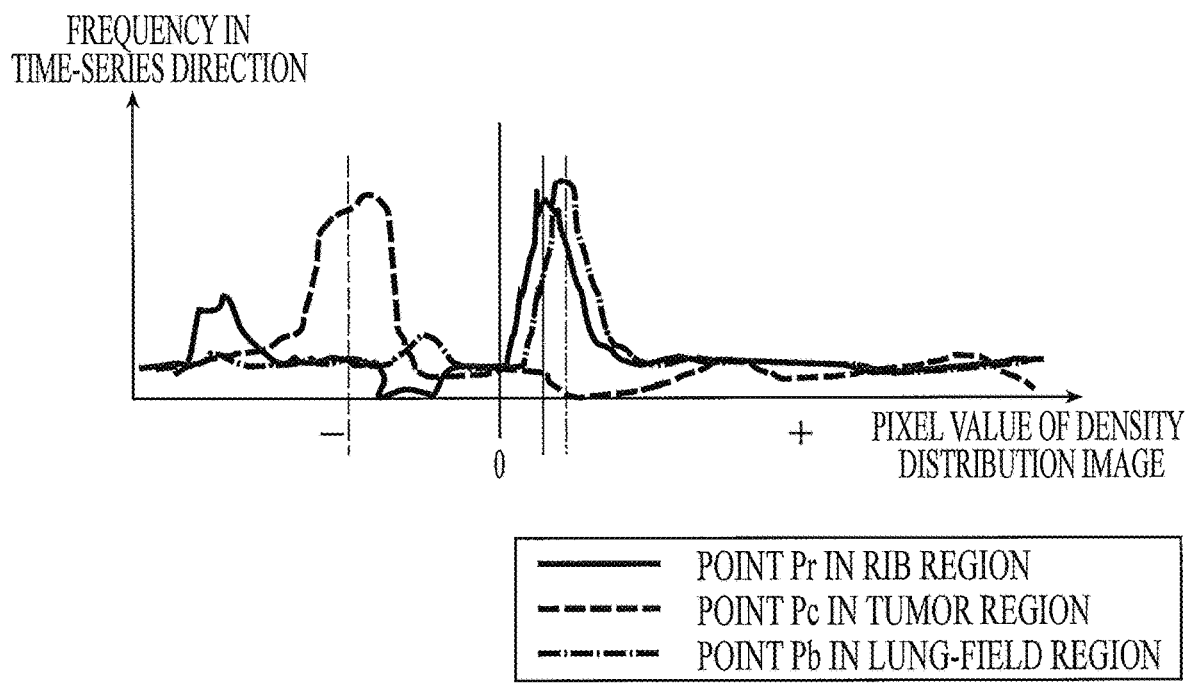
FIG. 12B is a frequency plot showing a frequency of pixel values in the time-series direction at a point Pr in a rib region, a point Pc in a tumor region, a point Pb in a lung-field region alone in the small region shown in FIG. 12A in a density distribution image.

In a case where the reference structure is the pulmonary blood vessels, for example, the frequency of pixel values in the time-series direction at a point Pc in the tumor region, a point Pb in the background region (region of lung field alone), and a point Pr in the rib region in a small region A1 of a frame image t of a dynamic image, as shown in FIG. 12A, is each represented in a frequency plot shown in FIG. 12B.

The pixel values of the equal density distribution image at the point Pc in the tumor region in the small region A1 of the frame image t in the dynamic image are explained next. In a case where the tumor region is in the small region A1 in a frame image t as shown in FIG. 12A, the tumor region exists at the point Pc in the small region A1 (the region corresponding to the small region A1 of the frame image t on the basis of the reference motion map) in other frame images because the tumors move in the same way as the pulmonary blood vessels. That is, as shown in FIG. 12B, the most frequent value (pixel value in the equal density distribution image) in the time-series direction in the group of density distribution images at the point Pc in the tumor region in the frame image t is the value corresponding to the tumor region. As shown in FIG. 12A, the proportion of the tumor region to the small region A1 is small (the lung-field region with a higher density is dominant). Thus, the pixel value of the equal density distribution image at the point Pc in the tumor region is smaller than the pixel value of 0 in the small region A1 of the density distribution image (reference density value), which is a negative value.

The pixel values of the equal density distribution image at the point Pb in the lung-field region in the small region A1 of a frame image t in the dynamic image are explained below. In a case where the lung-field region is in the small region A1 in a frame image t as shown in FIG. 12A, the lung-field region exists in the small region A1 (the region corresponding to the small region A1 of the frame image t on the basis of the reference motion map) in other frame images as the lung field is the background of the pulmonary blood vessels. That is, the most frequent value (pixel value in the equal density distribution image) in the time-series direction in the group of density distribution images at the point Pb in the lung-field region in the frame image t is the value corresponding to the lung-field region. The small region A1 includes regions with a lower density than the lung-field region such as the tumor region, as shown in FIG. 12A. Thus, the pixel value of the equal density distribution image at the point Pb in the lung-field region is larger than the pixel value of 0 (reference density value) in the small region A1 of the density distribution image, which is a positive value.

The pixel values of the equal density distribution image at the point Pr in the rib region in the small region A1 of a frame image t in the dynamic image are explained next. Though the rib region is in the small region A1 in the frame image t as shown in FIG. 12A, the rib region is out of the small region A1 (the region corresponding to the small region A1 of the frame image t on the basis of the reference motion map) in other frames and the lung-field region (background)) alone is at the point Pr in the small region A1 because the ribs move differently than the pulmonary blood vessels. After a while, the rib region is back in the small region A1. That is, as shown in FIG. 12B, the most frequent value (pixel value in the equal density distribution image) in the time-series direction in the group of density distribution images at the point Pr in the rib region of the frame image t is not the value corresponding to the rib region but the value corresponding to the lung-field region (positive value).

Figure 13A:
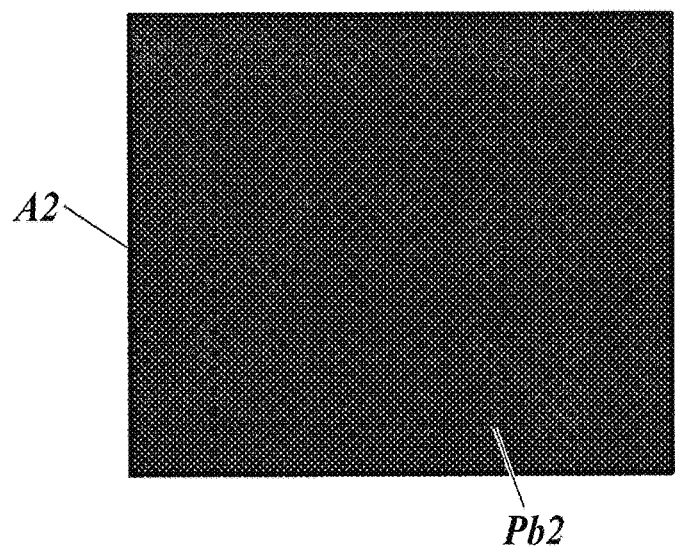
FIG. 13A shows a small region in a frame image of a dynamic image.
Figure 13B:
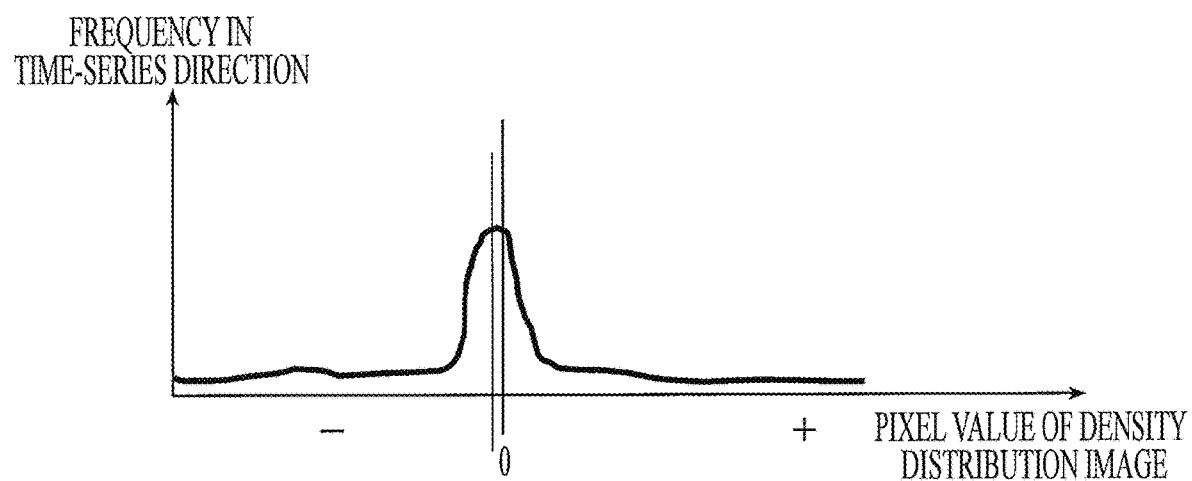
FIG. 13B is a frequency plot showing a frequency of pixel values in the time-series direction at a point Pb2 in a small region shown in FIG. 13A in a density distribution image.

When the reference structure is the pulmonary blood vessels, on the other hand, the frequency of pixel values in the time-series direction at a point Pb2 in the small region A2, as shown in FIG. 13A, which includes the lung-field region alone is represented in a frequency plot shown in FIG. 13B. That is, the pixel value of the point Pb2 in the equal density distribution image is mostly the pixel value of 0 (reference density value) of the small region A2 in the density distribution image.

The structures other than those moving in the same way as the reference structure have the pixel values varying at a high frequency in the time-series direction, because such structures move into and out of the small region over time. Thus, in the process (d), instead of the statistical processing in the time-series direction for each pixel (x, y) of the density distribution image, the components at a high frequency may be cut with a frequency filter in the time-series direction for each pixel (x, y) of the density distribution image and the values of the components at a low frequency may be obtained and set as the pixel values of the equal density distribution image.

(e) The equal density distribution images of respective calculation target points are integrated and the integrated equal density distribution image is generated for each frame image.

As the small regions of the calculation target points next to one another partly overlap, the representative pixel value of the overlapping equal density distribution images such as average value, median value, maximum value, or minimum value is calculated as represented by (Formula 3) and the integrated equal density distribution image is generated.

Pixel value of integrated equal density distribution
image=Representative pixel value of equal den-
sity distribution image of overlapping small
regions          (Formula 3)

When the small regions surrounding the calculation target points are set so small and do not spatially overlap with one another, the calculation may be simple as the pixel values of the equal density distribution image may use the pixel values of the integrated equal density distribution image without change.

(f) The enhance degree image indicating the degree of enhancement of pixels in each frame image is generated from the integrated equal density distribution image.

In a case where a structure with a lower density than the background region is to be enhanced as in this embodiment, the pixels of negative value in the integrated equal density distribution image are distinguished to be an enhancement target region and the pixel values of the integrated equal density distribution image are set as the enhancement degree. A pixel of 0 or positive value in the integrated equal density distribution image is distinguished to be a non-enhancement target region and the enhancement degree is set to 0. In a case where a structure with a higher density than the background region is to be enhanced unlike this embodiment, the pixels of positive value in the integrated equal density distribution image are distinguished to be the enhancement target region and the pixel values of the integrated equal density distribution image are set as the enhancement degree. A pixel of 0 or negative value in the integrated equal density distribution image is distinguished to be a non-enhancement target region and the enhancement degree is set to 0.

The process at Step S14 may be performed after the enhancement processing has been performed beforehand on the original dynamic image to enhance the structure to be visualized.

For example, when the form (circular, linear, etc.) and the size (spatial frequency) of the structure to be visualized are recognized, the enhancement processing may be performed beforehand on the original dynamic image to enhance the region of the structure to be visualized. The edge enhancement may be performed on the original dynamic image with an edge filter.

The structure to be visualized may have problems such as deformation and positional deviation. Positional deviation is caused as the motion amount of the structure to be visualized does not correspond perfectly with that of the reference structure. As a method of fixing positional deviation, the corresponding points are searched for with variable reference motion vectors using template matching, for example, and the corresponding points are corrected to be at the right positions. For fixing deformation, a spatial smoothing filter may be used beforehand on the small region image, for example, to reduce the effects of the minute gaps. This may also have effects on the problem of positional deviation.

The lung sometimes has the motion amount that varies in the depth direction. Even when the structure to be visualized (e.g. lung tumors) is at a position, in the depth direction, near the pulmonary blood vessels whose reference motion vectors are obtained, the motion amount may be slightly different. Thus, the positional deviation correction (correction of positions of corresponding points) may be done as described above. Alternatively, the equal density distribution images may be obtained at the corresponding points before and after the correction, and the average value of them may be obtained. In a case where positional deviation is corrected, the correction coefficient (correction coefficient $\alpha$ or $\beta$ described later) may be adjusted in the enhancement, according to the deviation from the position of the original reference motion vectors.

Next, the enhancement processing is performed on each frame image of the dynamic image on the basis of the enhancement degree image, and the enhancement image in which the enhancement target is enhanced is generated (Step S15).

For example, the pixel values of the enhancement image are calculated simply by addition or subtraction of the pixel values of the enhancement degree image to or from the pixel values of the original frame image (original pixel values). The enhancement degree of the enhancement target region may be controlled by multiplication by a, etc. An exemplary calculation formula of the pixel values of the enhancement image is (Formula 4).

Pixel values of enhancement image=α×(Pixel values of enhancement degree image)+Original pixel values   (Formula 4)

In this formula, a is a positive fixed value and may be set by a user according to the desirable enhancement degree. In a case where the corresponding point is corrected according to positional deviation, α may be modified according to the positional distance of correction. For example, as the positional distance of correction is longer (larger deviation), the value α is set to be smaller.

In a case where a is a negative fixed value, attenuation processing is performed. As the value gets far from 0 and near to −1, the attenuation degree increases. When the value is −1, the pixel value is cleared.

For example, when the reference structure is the pulmonary blood vessels, in the region of structure(s) (e.g. tumor region) moving in the same way as the pulmonary blood vessels, the pixel values of the equal density distribution image are negative as described above, and therefore the pixel values of the enhancement degree image are also negative. Accordingly, from (Formula 4) above, as the density values are lower in the enhancement image than the original pixel values, the gap with the background region stands out more.

The enhancement target region/non-enhancement target region may be distinguished on the basis of the enhancement degree image, and the enhancement image may be generated with (Formula 5) and (Formula 6) below. This causes the enhancement target region to be apparent by $\beta$ only, and keeps the region to be enhanced clear and natural.

Pixel values of enhancement target region of enhancement image=Original pixel values+β   (Formula 5)

Pixel values of non-enhancement target region of enhancement image=Original pixel values   (Formula 6)

Here, $\beta$ is a fixed value (a negative value in this embodiment).

The calculation may be performed only in the enhancement target region using (Formula 7) and (Formula 8) below, after the enhancement target region/non-enhancement target region is distinguished on the basis of the enhancement degree image. This enables an enhancement processing proportional to the amount of reaching radiation.

Pixel values of enhancement target region of enhancement image=Original pixel values×β   (Formula 7)

Pixel values of non-enhancement target region of enhancement image=Original pixel values   (Formula 8)

The enhancement image may be generated using the integrated equal density distribution image as represented by (Formula 9) below.

Pixel values of enhancement image=α×(Pixel values of integrated equal density distribution image)+Original pixel values   (Formula 9)

Here, a is a positive fixed value and may be suitably set by a user. In a case where the corresponding points are corrected according to the positional deviation, a may also be corrected according to the positional distance of correction. For example, as the positional distance of correction is longer (larger deviation), the value α is set to be smaller.

In a case where a is a negative fixed value, attenuation processing is performed. As the value gets far from 0 and near to −1, the attenuation degree increases. When the value is −1, the pixel value is cleared.

As the enhancement image is generated using (Formula 9), the enhancement target region may be enhanced and the density may be corrected at the pixels whose enhancement degree is set to 0 in the enhancement degree image.

For example, when the reference structures is the pulmonary blood vessels, in the region of structure(s) (e.g. tumor region) moving in the same way as the pulmonary blood vessels, the pixel values of the integrated equal density distribution image are negative as described above and therefore the pixel values of the enhancement degree image are also negative. Accordingly, from (Formula 9) above, as the density values are smaller in the enhancement image than the original pixel values, the gap with the background region stands out more.

In the background lung-field region, the pixel values of the integrated equal density distribution image are positive only when the region is near the pulmonary blood vessels or tumors with a lower density, and otherwise the pixel values are 0. Thus, in the enhancement image, the density values are larger than the original pixel values near the pulmonary blood vessels or tumors only, and the contrast with the surrounding region may be higher. As the pixel values of the integrated equal density distribution image are set to a statistical value (e.g. average value) of the pixel values of all the overlapping small regions on the equal density distribution image, the regional borders of the presence and absence of the density correction may be visually natural. Thus, the visibility is kept from deteriorating, and the image is made natural.

In the region where a structure(s) moving differently than the pulmonary blood vessels, the pixel values of the equal density distribution image are positive as described above, and thus the pixel values of the integrated equal density distribution image are positive. Accordingly, from (Formula 9) above, the density values are larger in the enhancement image than the original pixel values and get close to the background region, and the region does not stand out.

Next, the dynamic image on which structure(s) moving in the same way as the reference structure is enhanced is displayed on the display 34 (Step S16), and then the structure enhancement processing is completed.

The dynamic image is monochrome. However, the image may be colored on the display only where enhanced, in red color, for example. This enables easier recognition by doctors of the structure(s) moving in the same way as the reference structure.

Modification Example 1

The example in the above embodiment is as follows: the reference motion vectors are calculated on the basis of the reference structure specified by a user on the dynamic image; the motion indicated by the calculated reference motion vectors is set as the reference motion; and the structure(s) moving in the same motion as the set motion is enhanced. Alternatively, the motion indicated by the reference motion vectors input by the user may be set as the reference motion and the structure(s) moving in the same motion as the set reference motion may be enhanced.

In the above embodiment,

Reference motion vector=Vector (Vx, Vy) set at a point (x, y, t)

Reference Motion Map=Set of reference motion vectors at all points (x, y, t).

Methods of inputting data of five parameters (x, y, t, Vx, Vy) may be (A), (B), or (C) below, for example. The processes of display and input in (A) to (C) are executed by the controller 31 in cooperation with the programs stored in the storage 32.

(A) Directly Input and Modify the Data of Five Parameters

Figure 14A:
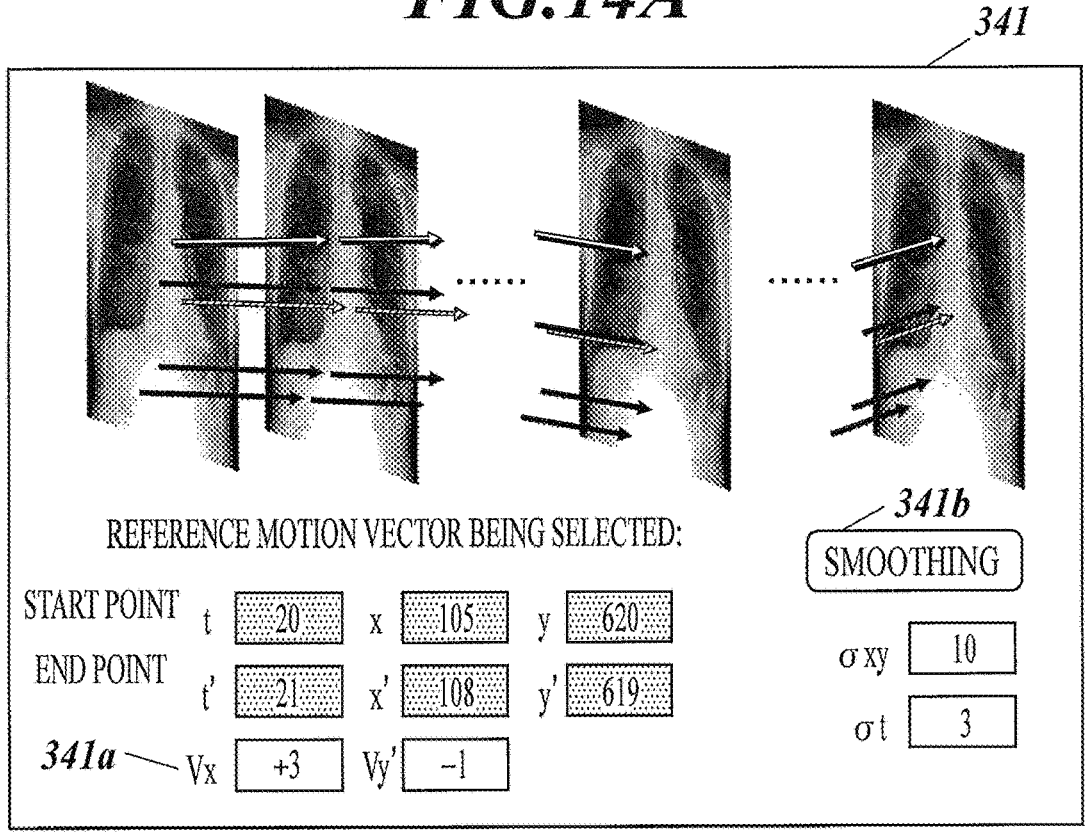
FIG. 14A shows an example of an input screen to input a reference motion of a structure to be enhanced.

For example, as shown in FIG. 14A, the screen 341 is displayed on the display 34, in which the reference motion map is indicated by arrows on frame images of a dynamic image expanded and displayed in the time-series direction. A user modifies the positions of start and end points of an arrow by drug and drop, etc. Then data of five parameters (x, y, t, Vx, Vy) according to the modified arrow and the modified positions of start and end points of the arrow is obtained as input information. An arrow indicating a predetermined direction may be displayed as an initial state of the reference motion map and modified by a user. Steps S10 to S13 in the above embodiment may be performed to generate a reference motion map according to the specified reference structure and an arrow displayed on it may be modified by a user's operation.

Alternatively, as shown in FIG. 14A, when an arrow is specified by a user's operation on the screen 341 displaying the reference motion map, the specified arrow may change its color and the start point (x, y, t) and the end point (x', y', t') of the specified arrow may be obtained. Then the screen may have a text area 341a in which values of (Vx, Vy) are to be input or modified. Alternatively, with an arrow being specified and (Vx, Vy) being input, the arrows which are spatially or temporally near the specified arrow may move associatively. For example, the arrows which are spatially or temporally near the specified arrow may move associatively when a smoothing button 341b is pressed. For example, smoothing parameters σxy, σt may be specified in advance and then modified for the near arrows to smoothly move.

Figure 14B:
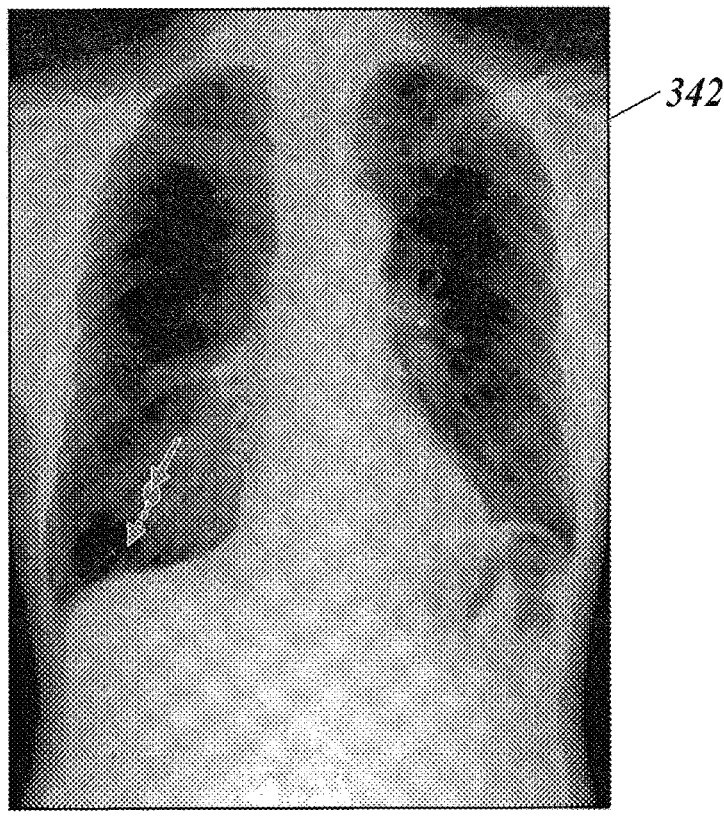
FIG. 14B shows an example of an input screen to input a reference motion of a structure to be enhanced.

Alternatively, when time t, t' is specified on the screen 341, etc. shown in FIG. 14A, the screen changes to the reference motion vector modification screen 342 of time t shown in FIG. 14B. After (x, y) on the screen is specified, the specified point and the arrow of the reference motion vectors are shown. The arrow shown on the display is modified by drug and drop etc. Then data of five parameters (x, y, t, Vx, Vy) according to the modified positions of start and end points of the specified arrow is obtained as input information.

Figure 15A:
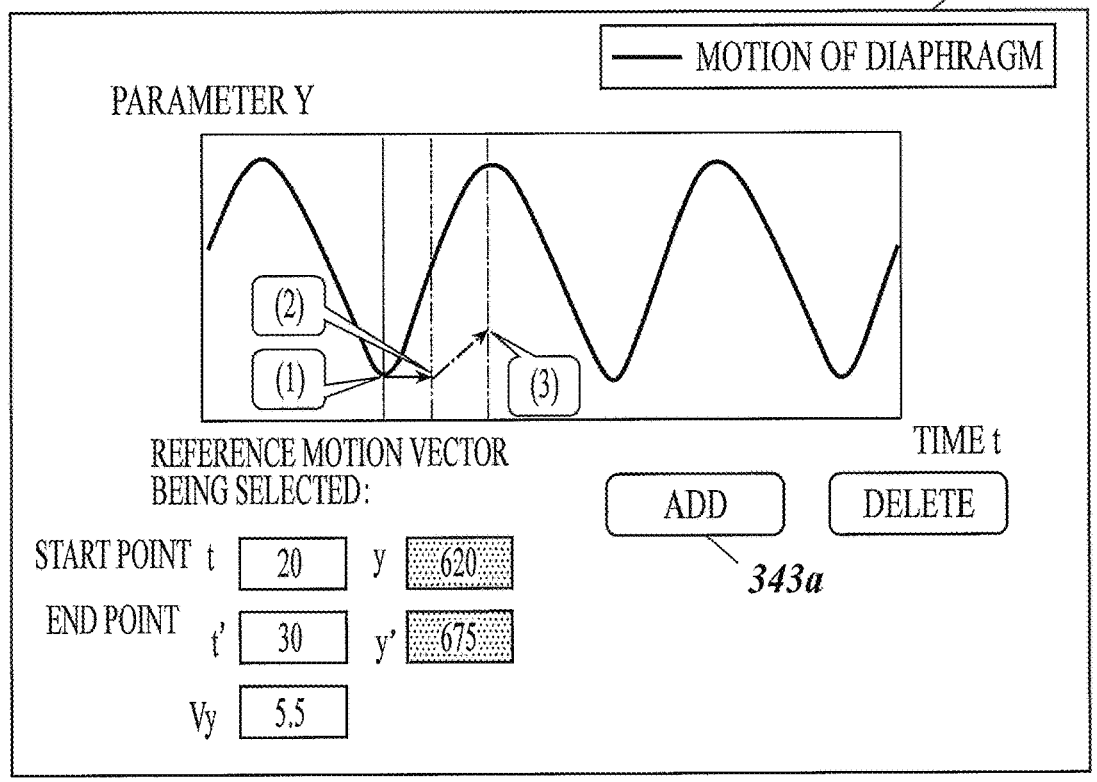
FIG. 15A shows an example of an input screen to input a reference motion of a structure to be enhanced.

(B) Input and Modify Limited Parameters and Determine the Rest of Parameters Simply For example, as shown in FIG. 15A, the screen 343 on which a graph indicating the time-series change of the position of the reference structure, etc. is displayed, and a user specifies ranges (t, t') and (y, y') on the screen to input the reference motion vectors (y, t, Vy) (Vy is calculated by Vy=y'−y).

A method of inputting may be as follows, for example.

(0) Click an "add" button 343a.

(1) Click, on the graph, time t and start point y of the reference motion vector to be input.

(2) Click time t' and end point y' on the graph.

(3) Input end point (t', y') of the next reference motion vector successively, if it is necessary in addition. End the "add" mode by clicking outside the region of screen.

No input for x here. For all parameters x, the reference motion vectors are generated to fulfill "Vx=0". Though a specific parameter y is specified in the above example, all parameters y may be input simultaneously.

The reference motion vectors may be input as the user specifies a range (t, t') on the screen and specifies Vy with another method. Other methods of inputting Vy may include inputting number parameters directly, inputting a rate to the movement of specified structure, etc.

Figure 15B:
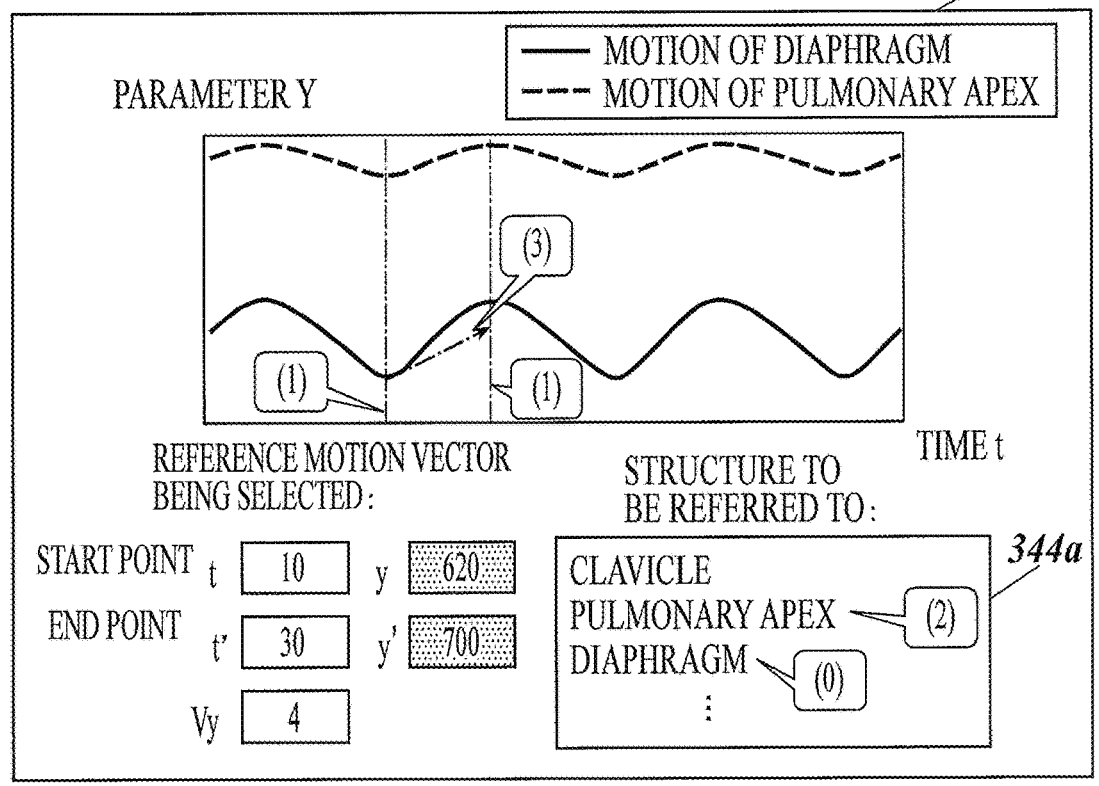
FIG. 15B shows an example of an input screen to input a reference motion of a structure to be enhanced.

A process of inputting the rate may be as follows, for example, on the screen 344 in FIG. 15B.

(0) Select a structure displayed in a region 344a. A graph showing the time-series variation of the position of the selected structure is displayed.

(1) Click to set time (t, t') on the graph.

(2) Specify one or more structures from the region 344a and command generation of combined vectors.

(3) Specify a method of combining.

For example, specify ½ of the speed of the diaphragm on the graph of the diaphragm. Half the speed Vy of the motion of the diaphragm is generated by this. Next, specify ½ of the speed of the pulmonary apex on the graph of the pulmonary apex. The speed Vy of the middle of the speeds of the diaphragm and the pulmonary apex is generated by this.
(C) Search in a Range of the Specified (Vx, Vy) and Display Structures Moving in the Same Motion as Options to Select the Reference Structure.

Figure 16A:
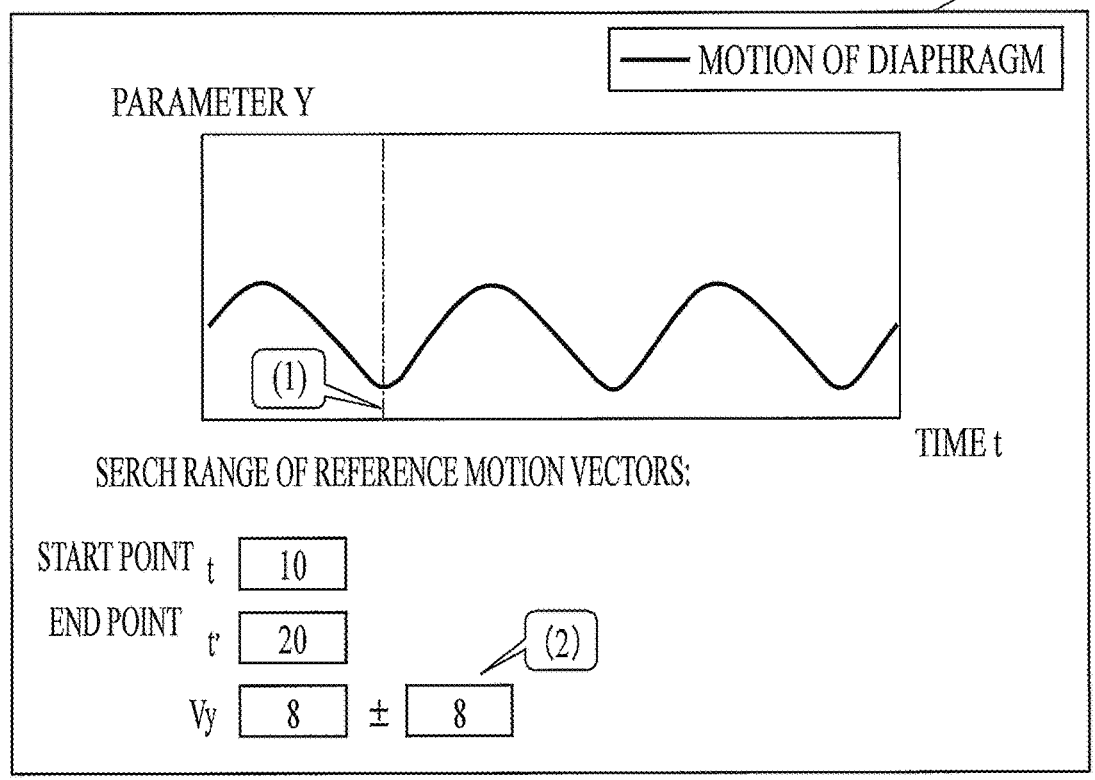
FIG. 16A shows an example of an input screen to input a reference motion of a structure to be enhanced.

A method of inputting may be as follows, for example.
(1) Set time (t, t') on the input screen 345 shown in FIG. 16A. Settings may otherwise be "Inspiration Phase," "Expiration Phase," or "First Breathing."
(2) Input a search range of Vy. For example, input a search range of Vy by value. The motion of other structure(s) to be referred to may be used to input the search range. A range of "positive" or "negative" is a possible option of input.

Figure 16B:
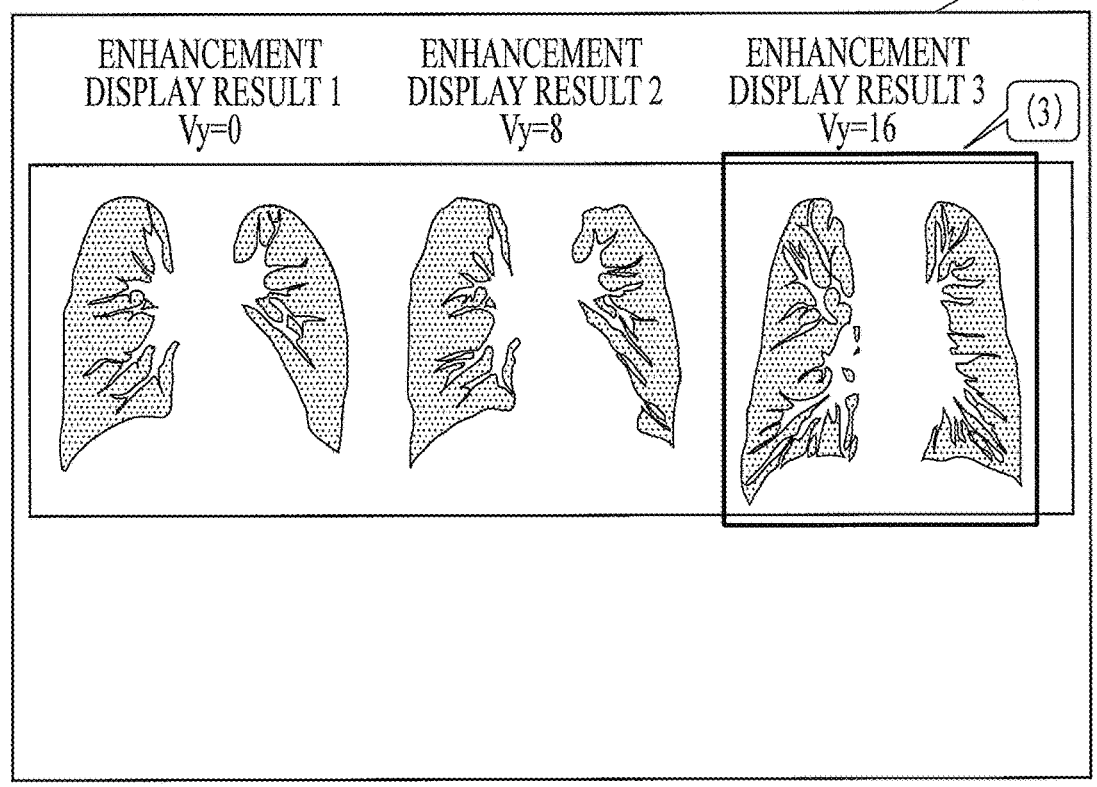
FIG. 16B shows an example of a screen displaying options of enhancement results.

The controller 31 performs enhancement by varying Vy in the specified range of Vy and displays the enhancement result options on the screen 346 on the display 34, as shown in FIG. 16B (showing only the results in the range of time (t, t'). The enhancement target region may be distinguished by whether the pixel values of the integrated equal density distribution image are over the threshold value, and the images of the enhancement target regions may be indicated as options.
(3) Set a structure in the enhanced region as the reference structure by a user's selection from the indicated options.

Modification Example 2

Dynamic images have problems in the visibility of minute structures such as pulmonary blood vessels, and it is difficult to determine the motion of the pulmonary blood vessels at a glance from dynamic images. Thus it is useful for diagnosis that the motion of the pulmonary blood vessels is shown by vectors on a still image.

Figure 17:
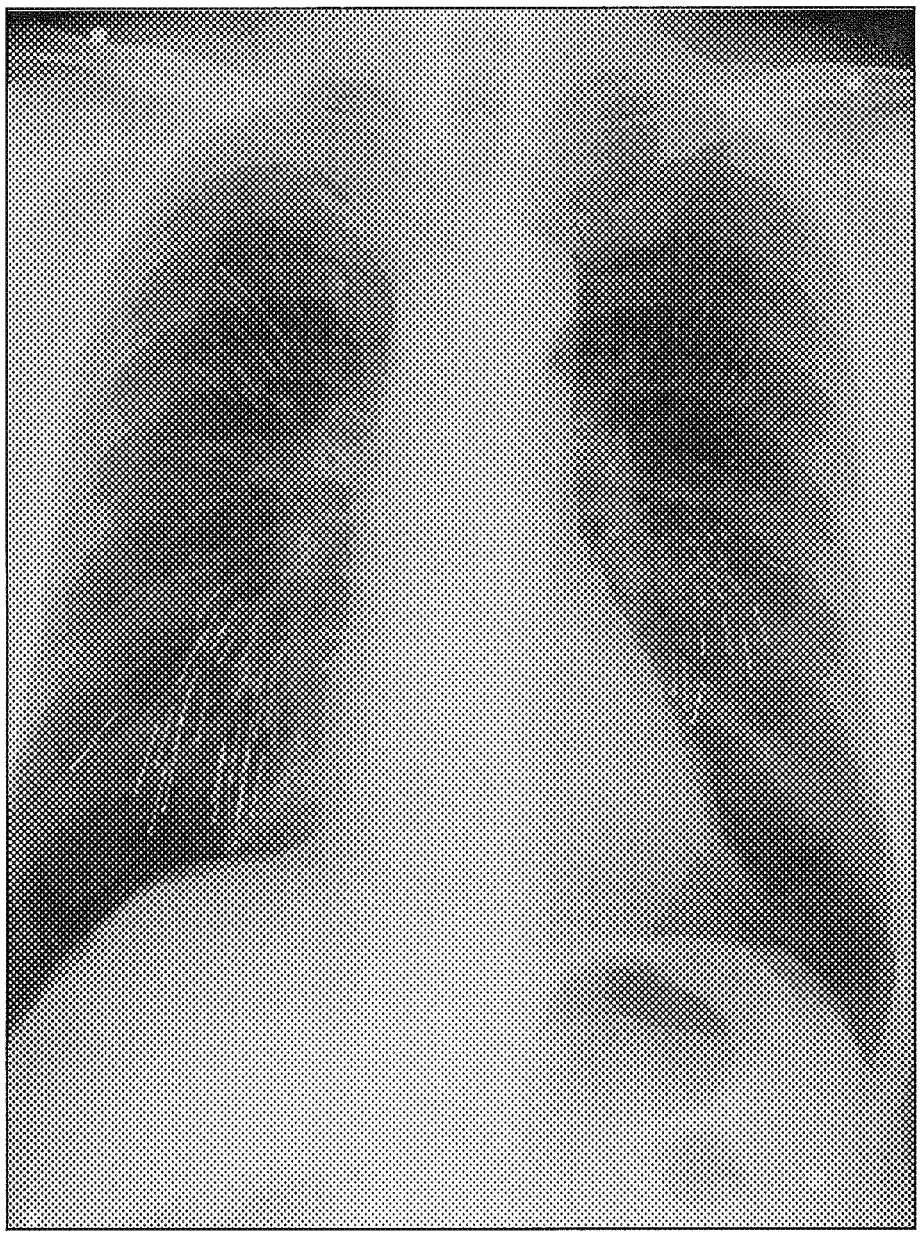
FIG. 17 shows an example of a frame image on which motion vectors calculated on the basis of motion between one frame image and a reference frame image and the frame image on which the motion vectors are superimposed.

For example, motion vectors are calculated on the basis of the motion between one frame image and the reference frame image which is set during expiration, and the frame image on which the motion vectors are superimposed is displayed. For example, as shown in FIG. 17, as the motion vectors between a frame image during inspiration and the reference frame image (during expiration) is displayed, the motion may be comprehended from one image without checking the dynamic image. It is difficult to comprehend the distribution of the motion of the pulmonary blood vessels only by a dynamic image. Thus, the distribution of the motion of the pulmonary blood vessels is shown on one image so that the distribution of the motion of the pulmonary blood vessels may be easily comprehended. The pulmonary blood vessels move with the lung-field. As the motion of the pulmonary blood vessels is indicated by vectors, it is possible to determine immediately at what point the lung region moves in a small amount or whether the upper lung also moves and to detect the lung-field region moving weakly. Thus, it is useful for the detection of region of disease.

The motion vectors may be shown by arrows in different colors according to the maximum speed. This is useful for the detection of parts moving slowly (moving slowly but in a large amount), etc. The colors of arrows may be different according to the phase of the maximum speed. This helps understand the deviation in propagation of the motion amount of the pulmonary blood vessels, for example.

Figure 18:
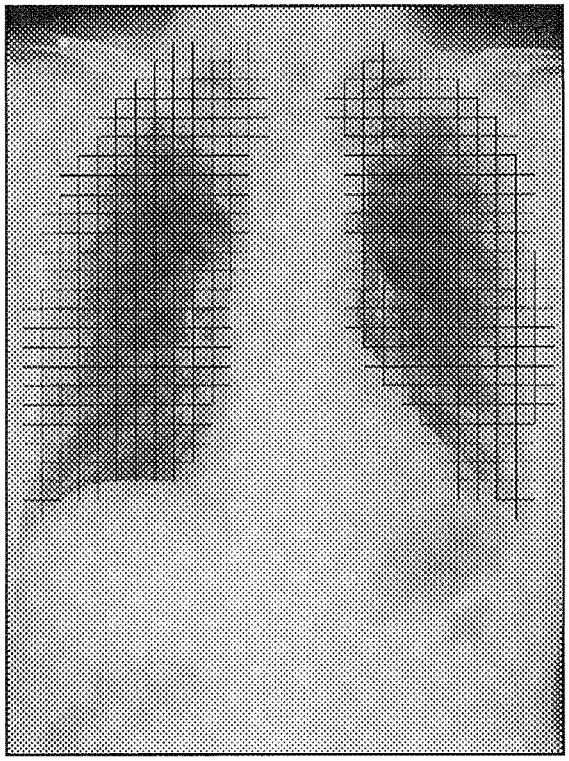
FIG. 18 shows a motion of lung-field indicated by meshes (grids).
Figure 18:
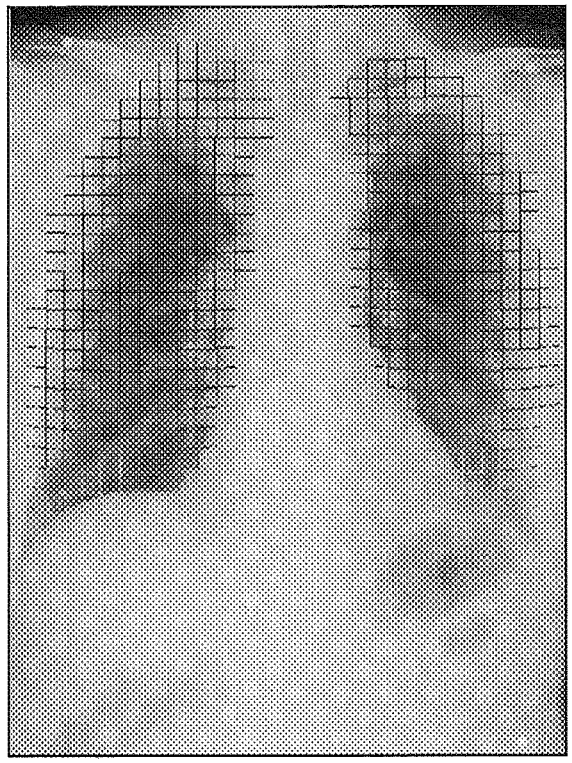

One of the methods of displaying the motion of the lung-field is as follows: meshes (grids) are superimposed on the reference frame image (during expiration) as shown in FIG. 18; corresponding points of the motion vectors on the target frame image (e.g. during inspiration) are calculated at each grid point of the reference frame image; lines are drawn between the calculated corresponding points and new grids are generated and displayed (displayed with meshes). Displaying the motion of the lung-field with meshes may improve the visibility of the change in the density of the motion of the lung-field region.

As described hereinbefore, the controller 31 of the diagnostic console 3 specifies the reference motion, sets the corresponding points for pixels of the dynamic image according to the reference motion among frame images, determines the enhancement degree of pixels of each frame image of the dynamic image on the basis of the equality of the density distribution in the small region surrounding the set corresponding points of the pixels in the target time range, and performs the enhancement processing on each frame image of the dynamic image on the basis of the determined enhancement degree. For example, the controller 31 calculates the differential values between the reference density value and the density value of pixels in the set small region surrounding the corresponding point, determines the enhancement degree of pixels of each frame image of the dynamic image on the basis of the most frequent value of the calculated differential values in the time-series direction, and then performs the enhancement processing on each frame image of the dynamic image on the basis of the determined enhancement degree. By the process described above, the structure(s) moving in the same motion as the reference is enhanced to stand out from the background of the lung-field region.

Thus, in the dynamic image, the structure(s) moving in the same motion as the reference motion may be enhanced and the visibility of the structure(s) may be improved. Especially, the visibility of minute structures such as tumors may be improved.

The matters described in the above embodiments are some of preferred examples of the invention, and not intended to limit the invention.

For example, the object region is the chest region in the above embodiments. However, the present invention is also applicable to dynamic images of other regions.

Further, for example, in the above, as a computer readable medium for the programs of the invention, a hard disk, a nonvolatile semiconductor memory, etc. is used. However, the computer readable medium is not limited thereto, and may be a portable recording/storage medium, such as a CD-ROM. Further, as a medium to provide data of the programs of the invention, a carrier wave can be used.

In addition to the above, the specific configurations/ components and the specific actions of the apparatuses of the dynamic image processing system can also be appropriately modified without departing from the spirit of the invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent Application No. 2017-245694, filed on Dec. 22, 2017, is incorporated herein by reference in its entirety.

What is claimed is:

1. A dynamic image processing method in a dynamic image processing device performing an image processing of a dynamic image which is obtained by radiographing of a dynamic state of a living body, the method comprising:

a setting step of setting a reference motion;
a corresponding point setting step of setting a corresponding point according to the reference motion among frame images of the dynamic image for each pixel of the dynamic image;
a determination step of determining an enhancement degree of each pixel of each of the frame images of the dynamic image based on equality of a density distribution in a target time range of a small region surrounding the corresponding point set for each pixel at the corresponding point setting step; and
an enhancement/attenuation processing step of performing enhancement processing or attenuation processing to each of the frame images of the dynamic image based on the enhancement degree determined at the determination step,
wherein the setting step comprises a specification step of specifying a reference structure, and includes setting a motion of the reference structure specified at the specification step as the reference motion, and
wherein the performing of the enhancement processing is performed only on those pixels of the dynamic image which move in the same direction as the reference structure, by comparison of the reference motion vectors of the entire image to the motion vectors of the reference structure.

2. The dynamic image processing method according to claim 1, wherein the determination step includes calculating a statistical value of the density distribution in the target time range in the small region surrounding the corresponding point set for each pixel of the dynamic image, and determining the enhancement degree of each pixel of each of the frame images of the dynamic image based on the calculated statistical value.

3. The dynamic image processing method according to claim 1, wherein the determination step includes calculating a differential value or a ratio of the density value of each pixel in the small region surrounding the corresponding point and a reference density value in the surrounding small region, and determining the enhancement degree of each pixel of each of the frame images of the dynamic image based on a statistical value of the calculated differential value or the ratio in the target time range.

4. The dynamic image processing method according to claim 3, wherein the reference density value is an average value or a median value of the density value in the surrounding small region.

5. The dynamic image processing method according to claim 2, the statistical value is a most frequent value.

6. The dynamic image processing method according to claim 5, wherein the determination step includes distinguishing an enhancement target region and a non-enhancement target region based on the most frequent value, and determining the enhancement degree based on a distinction result.

7. The dynamic image processing method according to claim 6, wherein the determination step includes distinguishing the enhancement target region and the non-enhancement target region based on a negative or positive sign of the most frequent value.

8. The dynamic image processing method according to claim 2,
wherein the small region surrounding the corresponding point includes a plurality of small regions surrounding a plurality of corresponding points, and
wherein the determination step includes determining the enhancement degree for a pixel at which the plurality of small regions surrounding the plurality of corresponding points set at the setting step overlap, based on a representative value of the statistical value calculated for the pixel in each of the plurality of surrounding small regions which overlap.

9. The dynamic image processing method according to claim 2, comprising a density correction step of correcting a density of the pixel for which the enhancement degree is set to 0 at the determination step according to the statistical value calculated for the pixel.

10. The dynamic image processing method according to claim 9,
wherein the small region surrounding the corresponding point includes a plurality of small regions surrounding a plurality of corresponding points, and
wherein the density correction step includes correcting a density of a pixel at which the plurality of small regions around the plurality of corresponding points set at the setting step overlap, based on the representative value of the statistical value calculated for the pixel in each of the plurality of surrounding small regions which overlap.

11. The dynamic image processing method according to claim 10, wherein the representative value is an average value.

12. The dynamic image processing method according to claim 1, wherein the corresponding point setting step includes calculating a motion vector of the reference structure after extracting a region of the reference structure from each of the frame images of the dynamic image, calculating a reference motion vector of each pixel of the dynamic image based on the calculated motion vector, and setting the corresponding point for each pixel of the dynamic image according to the reference motion vector among frame images.

13. The dynamic image processing method according to claim 1, wherein, in a case where a structure exists in a depth direction of the dynamic image is specified as the reference structure, the setting step further comprises a depth direction specification step of specifying a position of the reference structure in the depth direction, and includes setting a motion of the specified reference structure at the specified position in the depth direction as the reference motion.

14. The dynamic image processing method according to claim 1, wherein the reference structure is a blood vessel.

15. The dynamic image processing method according to claim 1, wherein the reference structure is a bone.

16. The dynamic image processing method according to claim 1, comprising an inputting step of inputting a motion vector, wherein the motion vector input at the inputting step is set as the reference motion.

17. The dynamic image processing method according to claim 1, further comprising a size inputting step of inputting a size of the surrounding small region.

18. A dynamic image processing device comprising a hardware processor that:
sets a reference motion;
sets a corresponding point according to the reference motion among frame images of the dynamic image for each pixel of the dynamic image;
determines an enhancement degree of each pixel of each of the frame images of the dynamic image based on equality of a density distribution in a target time range of a small region surrounding the corresponding point set for each pixel;

performs enhancement processing or attenuation processing to each of the frame images of the dynamic image based on the determined enhancement degree, specifies a reference structure, and sets a motion of the specified reference structure as the reference motion, wherein the enhancement processing is performed only on those pixels of the dynamic image which move in the same direction as the reference structure, by comparison of the reference motion vectors of the entire image to the motion vectors of the reference structure.

* * * * *